US012776051B2

(12) United States Patent
Cai et al.

(10) Patent No.: US 12,776,051 B2
(45) Date of Patent: Oct. 27, 2026

(54) UNCERTAINTY QUANTIFICATION FOR MONOCULAR DEPTH ESTIMATION

(71) Applicant: QUALCOMM Incorporated, San Diego, CA (US)

(72) Inventors: Hong Cai, San Diego, CA (US); Yunxiao Shi, San Diego, CA (US); Amin Ansari, Kirkland, WA (US); Sai Madhuraj Jadhav, Foster City, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 18/588,889

(22) Filed: Feb. 27, 2024

(65) Prior Publication Data

US 2025/0272861 A1 Aug. 28, 2025

(51) Int. Cl.
*G06T 7/50* (2017.01)
*G06V 10/40* (2022.01)
*G06V 10/82* (2022.01)

(52) U.S. Cl.
CPC ................ *G06T 7/50* (2017.01); *G06V 10/40* (2022.01); *G06V 10/82* (2022.01); *G06T 2207/20084* (2013.01)

(58) Field of Classification Search
USPC .......................................................... 382/154
See application file for complete search history.

(56) References Cited

U.S. PATENT DOCUMENTS 11,516,478 B2 * 11/2022 Kang ..................... G06V 20/46
2022/0343521 A1 * 10/2022 Wofk ........................ G06T 7/50

OTHER PUBLICATIONS

Sinha et al. (Samarth Sinha et al: "DIBS: Diversity inducing Information Bottleneck in Model Ensembles", arxiv.org, Cornell University Library, 201 Olin Library Cornell University Ithaca, NY 14853, Mar. 10, 2020 (Mar. 10, 2020), XP081618258 (Year: 2020).*
Hu D., et al., "Uncertainty Quantification in Depth Estimation via Constrained Ordinal Regression", Nov. 11, 2022, 19 Pages.
Kendall A., et al., "What Uncertainties Do We Need in Bayesian Deep Learning for Computer Vision?," 31st Conference on Neural Information Processing Systems (NIPS 2017), Oct. 2017, pp. 1-12.
Ranftl R., et al., "Vision Transformers for Dense Prediction", Computer Vision and Pattern Recognition, Mar. 2021, pp. 12179-12188.

(Continued)

*Primary Examiner* — Jacky X Zheng
(74) *Attorney, Agent, or Firm* — QUALCOMM Incorporated; Espartaco Diaz Hidalgo

(57) ABSTRACT

Certain aspects of the present disclosure provide techniques for generating an uncertainty metric used in monocular depth prediction. Such techniques may include generating, by an encoder, an encoded feature representation of the input image; generating, by a plurality of depth map prediction pathways, a plurality of outputs corresponding to a plurality of predicted depth maps based on the encoded feature representation; and generating an uncertainty metric indicating an uncertainty of the plurality of predicted depth maps based on one or more variances between the plurality of outputs.

20 Claims, 12 Drawing Sheets

(56) References Cited

OTHER PUBLICATIONS

International Search Report and Written Opinion—PCT/US2025/013579—ISA/EPO—Apr. 29, 2025.
Mazzaglia P., et al., "Uncertainty-driven Affordance Discovery for Efficient Robotics Manipulation", arxiv.org, Cornell University Library, 201 Olin Library Cornell University Ithaca, NY 14853, Aug. 28, 2023, 9 Pages, XP091599835, Abstract, Figure 1 p. 3, Left-hand column.
Poggi M., et al., "On the Uncertainty of Self-Supervised Monocular Depth Estimation", 2020 IEEE/CVF Conference on Computer Vision and Pattern Recognition (CVPR), IEEE, Jun. 13, 2020, pp. 3224-3234, XP033803528, DOI: 10.1109/CVPR42600.2020.00329, Retrieved on Oct. 3, 2020, Section 3.2, Figure 2(a).
Sinha S., et al., "DIBS: Diversity Inducing Information Bottleneck in Model Ensembles", arxiv.org, Cornell University Library, 201 OLIN Library Cornell University Ithaca, NY 14853, Mar. 10, 2020, 22 Pages, XP081618258, Sections 1, 2.4, 3.3, Figure 1.
Xiang M., et al., "Measuring and Modeling Uncertainty Degree for Monocular Depth Estimation", arxiv.org, Cornell University Library, 201 Olin Library Cornell University Ithaca, NY 14853, Jul. 19, 2023, 15 Pages, XP091567432, Abstract, Figure 1(a).

* cited by examiner

UNCERTAINTY QUANTIFICATION FOR MONOCULAR DEPTH ESTIMATION

FIELD OF THE DISCLOSURE

Aspects of the present disclosure relate to computer vision, and more particularly, to techniques for uncertainty quantification for monocular depth estimation.

DESCRIPTION OF RELATED ART

Monocular depth estimation predicts depth (e.g., pixel-level depth, block-level depth, etc.) from a single image, but often suffers from uncertainty, such as where the image is taken in areas of poor lighting, the image captures reflections, insufficient training data coverage is used for a machine learning (ML) model used to perform depth estimation on the image, etc. For example, one factor affecting depth prediction uncertainty is lighting variability. Models are often trained on daytime images, and can be less certain on nighttime or low/variable lighting images. Similarly, reflections, shadows, transparent surfaces can impact certainty. Weather conditions like rain or fog increasing ambiguity around object boundaries also pose difficulties. Diversity of environments affects uncertainty as well-a model trained mostly on urban cityscapes may be less certain for rural countryside settings. Limited field of view poses challenges to cover all possible scene configurations. Together these limitations mean some areas/objects may inherently be prone to higher uncertainty during inference.

Quantifying such uncertainty may be useful, such as to avoid the use of potentially erroneous depth estimates for various applications, such as safety-critical applications. For example, applications such as collision avoidance, range estimation of objects, and 3D reconstruction of a scene captured by an image may be used for scenarios such as autonomous driving. Use of erroneous depth estimates may lead to accidents in such scenarios. By identifying whether certain depth estimates are uncertain, uncertain depth estimates may not be used, or may be weighted lower when fused with other depth estimates, to potentially avoid decision making on poor depth estimates.

Traditional uncertainty quantification approaches are computationally expensive, and may not be suitable for systems with resource constraints. There is a need therefore, for computationally efficient uncertainty quantification for monocular depth estimation.

SUMMARY

One aspect provides a method for generating an uncertainty metric associated with depth map predictions. In certain aspects, the method may include generating, by an encoder, an encoded feature representation of an input image; generating, by a plurality of depth map prediction pathways, a plurality of outputs corresponding to a plurality of predicted depth maps based on the encoded feature representation; and generating an uncertainty metric indicating an uncertainty of the plurality of predicted depth maps based on one or more variances between the plurality of outputs.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
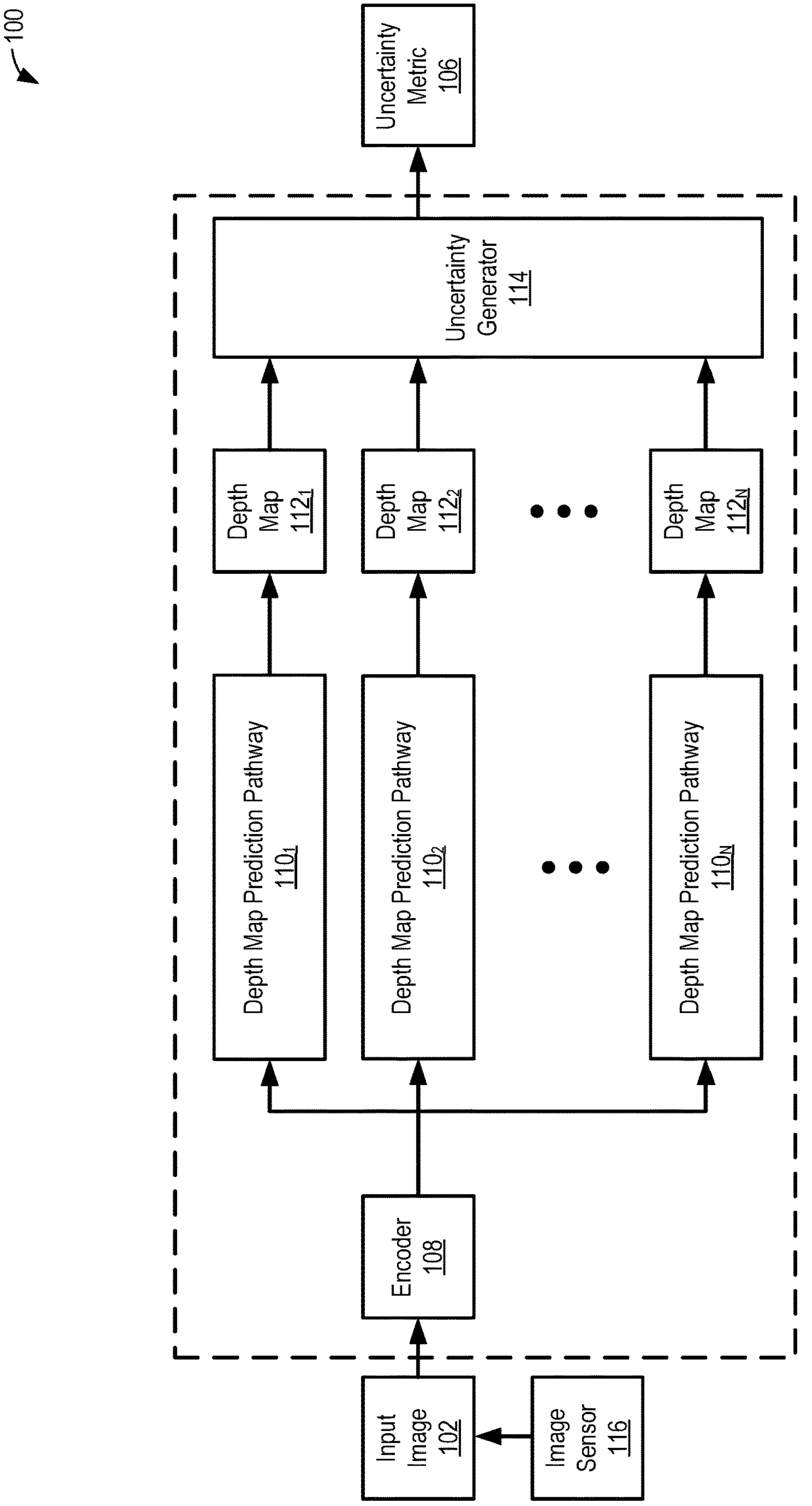
FIG. 1 depicts details of a monocular depth estimation system, in accordance with some aspects of the present disclosure.

Aspects of the present disclosure provide apparatuses, methods, processing systems, and computer-readable mediums for uncertainty quantification for monocular depth estimation.

Quantifying uncertainty allows downstream usage of depth predictions in a reliable manner. For instance, based on predicted depth map uncertainty, less reliable areas of depth maps can be fused differently and/or depth predictions for uncertain regions can be discarded.

In some cases, to quantify uncertainty of a predicted depth map for an image, multiple machine learning model inferences are performed using the image to generate multiple predicted depth maps. Variance between the multiple predicted depth maps may be indicative of uncertainty in the predicted depth maps for the image, where greater variance indicates greater uncertainty, and less variance indicates less uncertainty. For example, multiple different machine learning models may be run, the same machine learning model may be run multiple times one a same or different input, and/or a Bayesian neural network may be used. However, a technical problem with such techniques is that running multiple machine learning model inferences is computationally expensive, and may not be suitable for devices with lower compute budgets.

Aspects herein provide uncertainty quantification techniques that provide a technical benefit in that they may reduce computational complexity by avoiding performing multiple entire machine learning model inferences. For example, aspects described herein provide uncertainty quantification using an efficient single-encoder-pass model inference, whereby the image is encoded only once, and the encoder output is shared by multiple different depth map prediction pathways (e.g., decoder pathways) that may generate multiple different predicted depth maps.

For example, in certain aspects, an encoder encodes an input image into features. Multiple depth map prediction pathways (e.g., decoder pathways) then predict depth maps based on the same encoder features. There may be different outputs associated with the different predicted depth maps, such as the predicted depth maps themselves and/or features output from intermediate layers or kernels of the depth map prediction pathways used to predict the depth maps. Variances between one or more outputs corresponding to the predicted depth maps may indicate uncertainty and may be quantified.

In certain aspects, additional components, (e.g., decoder components) may be shared between the depth map prediction pathways, such as to further reduce parallel computations between the depth map prediction pathways, thus further reducing computational requirements for performing uncertainty quantification.

In certain aspects, the uncertainty quantification techniques described herein provides customizable uncertainty modeling meeting diverse runtime performance profiles. Accordingly, safety-critical applications may selectively leverage reliable aspects of a predicted depth or discard uncertain unreliable image regions based on the uncertainty metric associated with depth map predictions. Accordingly, as described herein, in certain aspects, uncertainty metrics can be obtained without requiring multiple model instances or expensive recurrent computations, which may facilitate usage with systems having tight computational budgets.

Aspects Related to Monocular Depth Estimation with Uncertainty Quantification

When utilizing a machine learning model for prediction tasks, there are two main types of uncertainty in the output-aleatoric uncertainty (also known as error variance) inherent in observations, and epistemic uncertainty (also known as estimation variance) related to limited model knowledge.

Aleatoric uncertainty stems from noise or randomness in measurements. For monocular depth estimation, this can include factors like sensor noise, exposure variability when capturing images, or motion blurring of pixel intensity boundaries between objects. Aleatoric uncertainty can therefore set a fundamental limit on performance since some ground truth aspects contain randomness.

Epistemic uncertainty arises from a machine learning model's limited knowledge outside the training distribution, either due to insufficient training data volume or gaps in diversity coverage. For instance, depth prediction models may have seen thousands of urban cityscape images but far fewer rural countryside images during training.

For quantifying aleatoric uncertainty in monocular depth estimation, some approaches utilize likelihood-based loss functions. These model per-pixel depth estimates as probability distributions-predicting both mean depth and variance at each pixel location. For example, for each pixel in an input image, mean and variance can be calculated as follows:

$$-\log p\left(y_i \mid f^{\hat{W}_i}(x_i)\right) \propto \frac{1}{2\sigma^2}\left\|y_i - f^{\hat{W}_i}(x_i)\right\|^2 + \frac{1}{2}\log\sigma^2$$

where, $y_i$ is the ground truth depth, $x_i$ is the input image, $\mathbf{f}^{\hat{W}_i}(x_i)$ is the predicted depth and σ is the predicted standard deviation. Probability distributions like Gaussian, Laplacian, or Log-Gaussian can characterize likelihood with different assumptions for density shape, tails, etc.

For quantifying epistemic uncertainty, some approaches utilize determination of variance between multiple outputs generated using multiple machine learning model inferences. However, as discussed, this can be computationally expensive. Accordingly, in certain aspects, techniques discussed herein may provide uncertainty quantification using an efficient single-encoder-pass model inference, whereby the image is encoded only once, and the encoder output is shared by multiple different depth map prediction pathways (e.g., decoder pathways) that may generate multiple different predicted depth maps. Accordingly, in certain aspects the techniques discussed herein may be more directed to determining epistemic uncertainty, as opposed to aleatoric uncertainty. For example, various aleatoric uncertainty estimation techniques may be used in conjunction with techniques discuss herein to determine uncertainty.

Example Operations Related to Monocular Depth Estimation with Uncertainty Quantification FIG. 1 depicts details of a monocular depth estimation system 100, in accordance with some aspects of the present disclosure. As previously discussed, monocular depth estimation determines a distance to objects or surfaces for on one or more pixels in a single image (e.g., obtained from a single image sensor (e.g., camera)) without extrinsic information, such as additional sensor information. In addition, uncertainty quantification can identify potentially erroneous or ambiguous depth predictions. In certain aspects, the monocular depth estimation system 100 can include an encoder 108 configured to generate an encoded feature representation of the input image 102. In examples, the encoder 108 comprises one or more neural networks, including convolutional layers, pooling layers, and/or fully connected layers, configured to generate the encoded feature representation of the input image 102. The encoder 108 may utilize a deep convolutional neural network architecture such as ResNet, ConvNeXt, or a Vision Transformer to extract hierarchical features representing the content and context of the input image across multiple levels of abstraction. The encoded feature representation output by the encoder 108 provides a descriptive embedding of the input image to be used by downstream components for depth estimation.

The monocular depth estimation system 100 can also include a plurality of depth map prediction pathways $\mathbf{110}_1$-$\mathbf{110}_N$ for generating a plurality of outputs corresponding to a plurality of predicted depth maps $\mathbf{112}_1$-$\mathbf{112}_N$ based on the encoded feature representation. Though at least three prediction pathways 110 and accordingly at least three predicted depth maps 112 are shown, there may be any number, such as two or more than three. For example, depth map prediction pathway $110_1$ generates predicted depth map $112_1$, depth map prediction pathway 1102 generates predicted depth map $112_2$, and depth map prediction pathway $110_N$ generates predicted depth map $112_N$. In certain aspects, the predicted depth maps 112 comprise per-pixel depth estimates indicating the predicted distance of each pixel of the input image from the camera used to capture the image. In some examples, the predicted depth maps 112 may have the same spatial resolution as the input image 102. In certain aspects, each depth map prediction pathway 110 may comprise a decoder neural network containing convolutional layers, upsampling layers, and other components to transform the encoded feature representation into a spatial depth map output aligned with the input image dimensions.

The monocular depth estimation system 100 may include an uncertainty generator 114 configured to generate an uncertainty metric 106 indicating an uncertainty associated with the plurality of predicted depth maps. For instance, the uncertainty metric 106 may reflect the variance between the predicted depth maps $112_1$-$112_N$ from the multiple prediction pathways $110_1$-$110_N$ (and/or other outputs associated with the multiple prediction pathways $110_1$-$110_N$). In certain aspects, the uncertainty generator 114 is configured to analyze the variance between the plurality of predicted depth maps 112 generated by the multiple depth map prediction pathways 110 and determine regions of high uncertainty where the predictions disagree or diverge. The uncertainty generator 114 may compute statistical variance metrics between the predicted depth maps 112, such as pixel-level variance of depth values across the set of predicted depth maps or block-level statistical variance focused on dissimilar regions. In certain aspects, the uncertainty metric provides insight into the reliability and consistency of the predictions from a depth estimation model implemented by the depth map prediction pathways 110. For example, high variances can indicate possible erroneous or ambiguous depth predictions due to epistemic uncertainties, such as but not limited to insufficient training of a depth estimation model, insufficient amounts of data, and/or lack of coverage of diverse data. In certain aspects, the uncertainty generator 114 utilizes the multiple depth map prediction pathways 110 to quantify these epistemic uncertainties without requiring additional model inferences. That is, in examples, a single encoding pass can generate predicted depth maps 112 which can then be used to obtain an uncertainty metric 106.

In examples, the uncertainty metric 106 output by the uncertainty generator 114 can provide a per-pixel or region-based visualization of the uncertainty modeled from the variances between the predicted depth maps 112. For example, the uncertainty metric may comprise a variance map, entropy map, or confidence score map highlighting image regions having inaccurate monocular depth estimations. The uncertainty metric 106 can be used by downstream applications to account for unreliable depth when using the output for tasks like 3D reconstruction, collision avoidance, etc. Thus, downstream applications can treat areas of high depth uncertainty for parts of an image differently than areas of low depth uncertainty for other parts of an image. For example, areas of high depth uncertainty for parts of an image may be weighted less heavily during an image fusion process or disregarded altogether by a downstream application.

The monocular depth estimation system 100 can further include one or more processors (not shown), coupled to one or more memories, and configured to execute the functions of the encoder 108, depth map prediction pathways 110, and uncertainty generator 114. In some implementations, the monocular depth estimation system 100 additionally includes at least one image sensor 116 configured to acquire the input image 102. Alternatively, in some implementations, the monocular depth estimation system 100 includes a modem and one or more antennas (not shown) configured to receive the input image 102 from an external source.

Figure 2A:
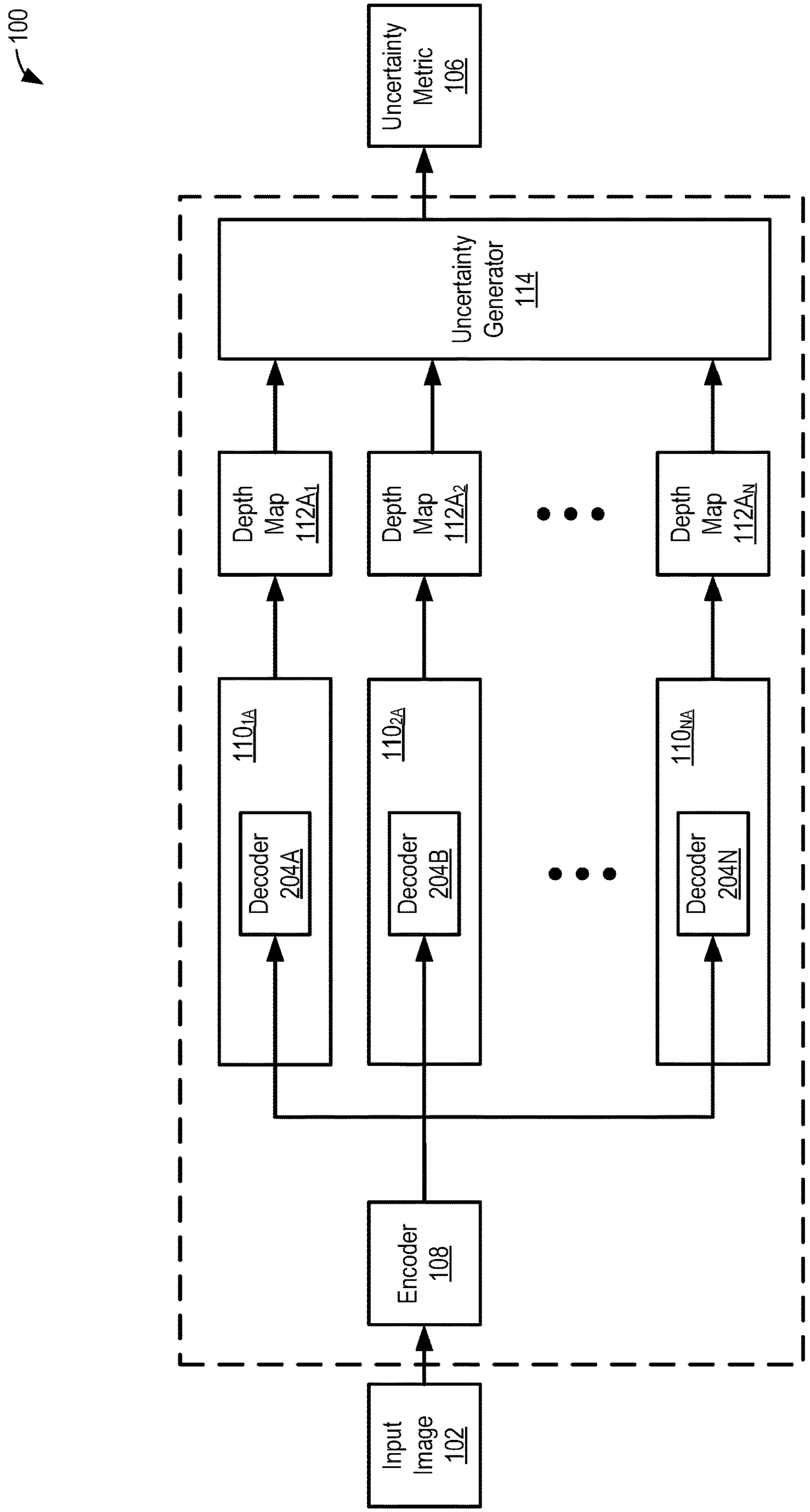
FIG. 2A depicts additional details of an implementation of a monocular depth estimation system in accordance with examples of the present disclosure.

FIG. 2A depicts additional details of an implementation of the monocular depth estimation system 100 in accordance with examples of the present disclosure. As depicted in FIG. 2A, the monocular depth estimation system 100 includes components similar to those described above regarding FIG. 1. For instance, the monocular depth estimation system 100 includes an encoder 108 for generating an encoded feature representation of the input image 102, a plurality of depth map prediction pathways $110_{1A}$-$110_{NA}$ for generating predicted depth maps $112A_1$-$112A_N$, and an uncertainty generator 114 for generating an uncertainty metric 106. Though at least three prediction pathways 110 and accordingly at least three predicted depth maps 112A are shown, there may be any number, such as two or more than three. However, as depicted in FIG. 2A, there are multiple parallel depth map prediction pathways $110_{1A}$-$110_{NA}$, each comprising a respective decoder 204A-204N. That is, in certain aspects, the depth map prediction pathway $110_{1A}$ includes decoder 204A, the depth map prediction pathway $110_{2A}$ includes decoder 204B, and depth map prediction pathway $110_{NA}$ includes decoder 204N. In certain aspects, each decoder 204 is configured to receive the encoded feature representations from encoder 108 as input and generate a respective predicted depth map 112A as output based on the received encoded feature representation. In certain aspects, the decoders 204 transform the encoded feature representation into predicted depth maps 112A aligned with the dimensions of the input image.

In some implementations, each decoder 204 includes convolutional layers for extracting features from the encoded representation and upsampling layers for progressively increasing the spatial resolution until reaching the full resolution of the input image 102. The decoders 204 may contain layers and components symmetrical to those found in the encoder 108. In certain aspects, the multiple depth prediction pathways $110_{1A}$-$110_{NA}$ have the same or similar decoder architectures (e.g. 204A, 204B, 204N). Accordingly, the differences in the output predicted depth maps 112A is, therefore, mainly due to variances in the trained weights of each decoder (e.g., 204A, 204B, 204N), rather than due to explicit decoder architectural differences. Stated another way, the multiple decoders (e.g., 204A, 204B, 204N) of the same architecture allows for introducing small variations between predicted depth maps (e.g., $112A_1$-$112A_N$) due to differences in trained weights; such variations enable analysis of uncertainty and variance between the multiple predicted depth maps 112 output by the parallel depth map prediction pathways $110_{1A}$-$110_{NA}$.

Figure 2B:
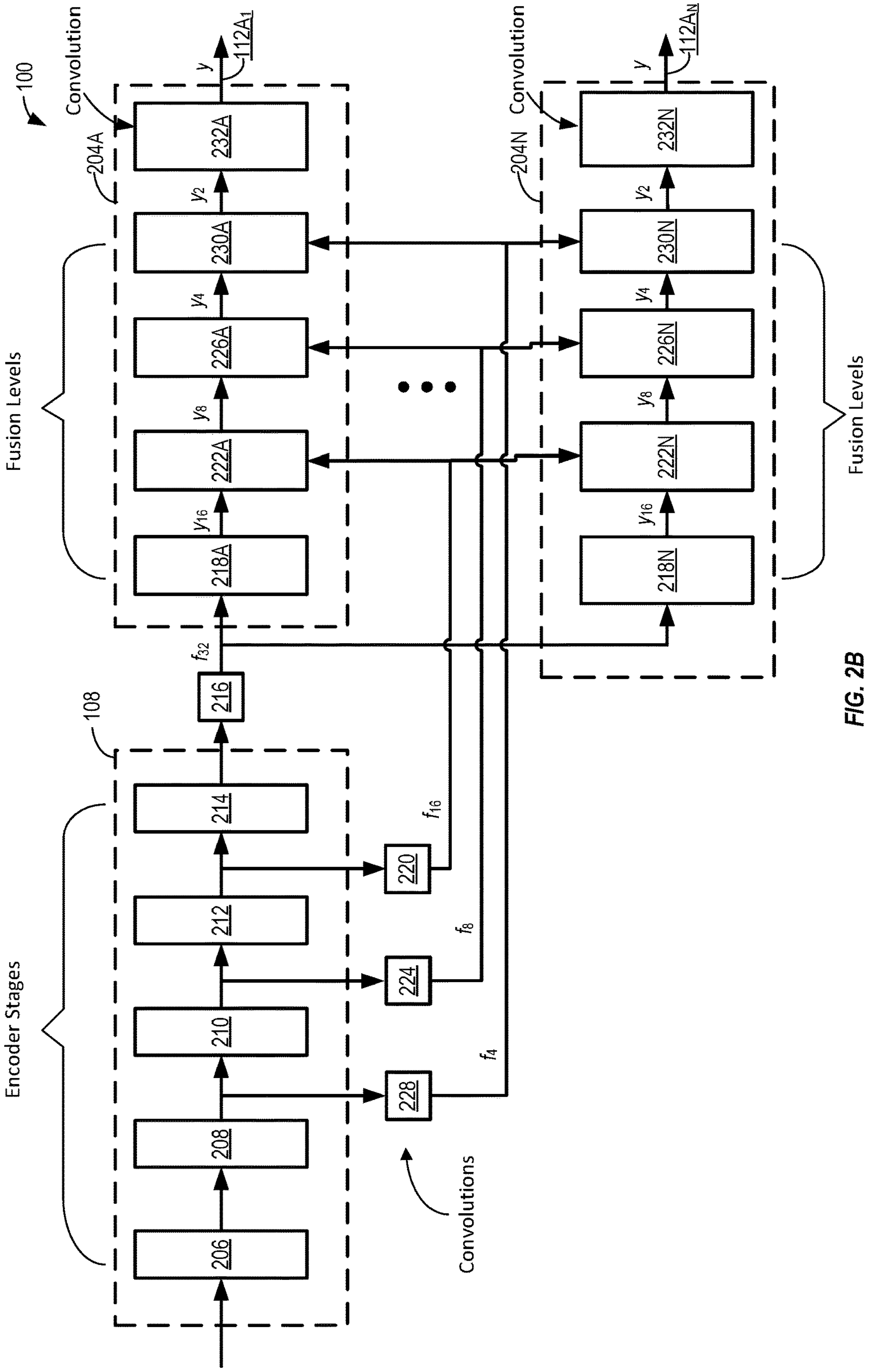
FIG. 2B depicts additional details of the encoder and decoder of FIG. 2A, in accordance with examples of the present disclosure.

FIG. 2B depicts additional details of examples of the encoder 108 and decoder 204 of FIG. 2A, in accordance with examples of the present disclosure. It should be noted that other encoder and decoder architectures may similarly be used. As shown in FIG. 2B, the encoder 108 can include multiple encoder stages that may include convolution blocks to progressively compress the input image 102 into a compact encoded feature representation. For example, in certain aspects, the encoder 108 starts with a convolution stem 206 to extract initial features from input image 102. This is followed by additional encoder stages 208, 210, 212, and 214 that apply convolutions using convolutional neural network architectures like ResNet or Vision Transformers, with each stage outputting feature maps with smaller spatial resolution but richer semantic representation.

As an example, encoder stage 208 operates on a feature map of resolution of 32×32 to generate a 16×16 resolution feature map, encoder stage 210 operates on 16×16 resolution feature map to generate an 8×8 resolution feature map, encoder stage 212 operates on an 8×8 resolution feature map to generate a 4×4 resolution feature map, and encoder 214 operations on a 4×4 resolution feature map to generate a 2×2 resolution feature map. In certain aspects, the output encoded representation 216 (e.g., at resolution 2×2) from encoder 108 is provided as input to the multiple parallel decoders 204A-N as depicted in FIG. 2A for predicting depth maps 112$A_1$-112$A_N$. Each of the decoders 204A-204N may include a respective one of each of fusion stages 218A-N, 222A-N, 226A-N, and 230A-N that progressively increase the spatial resolution of the input encoded feature representation. For instance, fusion stage 218 upsamples the input encoded feature representation by a factor of 4 (e.g., 2× height, 2× width) to produce a feature map of 4×4 resolution. In certain aspects, the fusion layers can use efficient operations like transpose convolutions to upsample.

In certain aspects, the output convolution head 232 predicts a depth value for each spatial location of the input image to generate the predicted depth map 112A matching the spatial dimensions of input image 102. In this manner, the decoder 204 transforms the low resolution encoded input into a full resolution predicted depth map 112A. These predicted depth maps 112$A_1$-112$A_N$ may be outputs fed into the uncertainty generator 114 (FIG. 2A) to estimate an uncertainty metric 106 based on variances between the predicted depth maps 112$A_1$-112$A_N$.

In certain aspects, the decoder 204 may receive encoded features from various stages of the encoder 108. For example, convolution blocks 220, 224, and 228 can obtain encoded features following encoder stages 208, 210, and 212 of the encoder 108. The convolution blocks 220, 224, and 228 further process and refine the encoded features before passing the encoded features to the fusion layers in the decoder 204. In certain aspects, the convolution block 228 may receive low-resolution encoded features from encoder stage 212. In some examples, the convolution block 228 can apply additional convolutions, such as repeated 3×3 filters, to enrich these features and enhance the feature representations before decoding the features into depth maps.

Figure 2C:
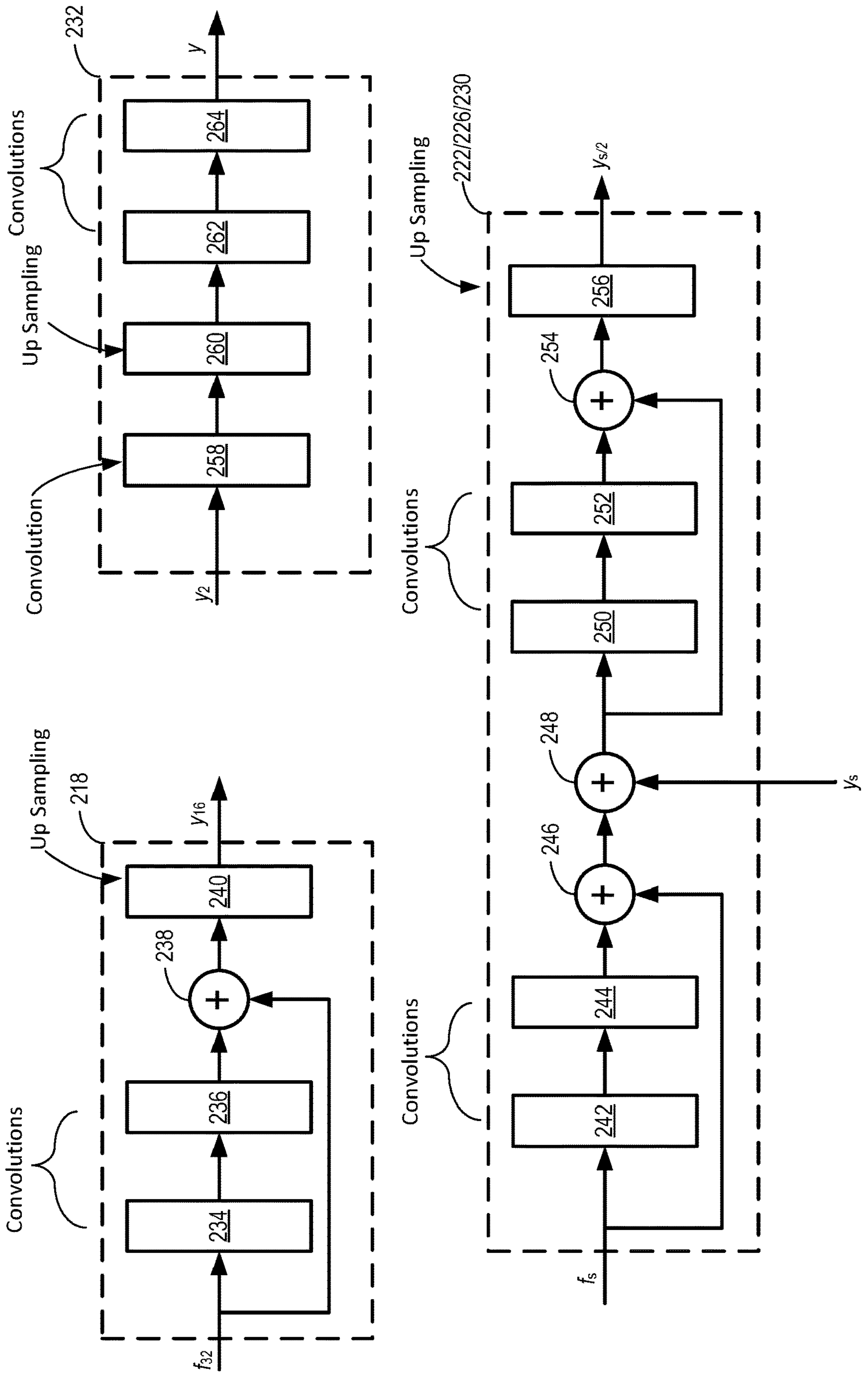
FIG. 2C depicts additional details of a decoding process to recover spatial resolution and generate a predicted depth map in accordance with examples of the present disclosure.

FIG. 2C depicts additional details of an example decoding process to recover spatial resolution and generate a predicted depth map 112 in accordance with examples of the present disclosure. As described earlier, in certain aspects, the decoder 204 uses multiple fusion stages and interposed operations to reconstruct image dimensions. In certain aspects, the fusion stage 218 receives encoded input features (resolution f32 (e.g., $1/32^{nd}$ of the original input resolution) and doubles each spatial dimension to y16 (e.g., $1/16^{th}$ of the original input resolution). More specifically, one or more of the convolutional layers 234 and 236 process the input features. In some examples, the summer 238 concatenates relevant encoded features to augment the decoder features. Convolution layers 240 further refines the combined representation to output features (e.g., having resolution of y16). The series of fusion stages 222, 226 and 230 repeat this process to gradually increase the resolution to an output of $y_{s/2}$. Within each stage, transpose convolutions (e.g. 242, 244) upsample, then concatenation operations (e.g. 246, 248) combine appropriate encoded features. One or more convolution layers (e.g. 250, 252, 256) can further enrich the input features. In some examples, the summer 254 reduces the number of channels after concatenation 248. Final upsampling 258 and subsequent convolution layers 260, 262, 264 generate the predicted depth map 112, with dimensions matching the input image for depth estimation.

Figure 3:
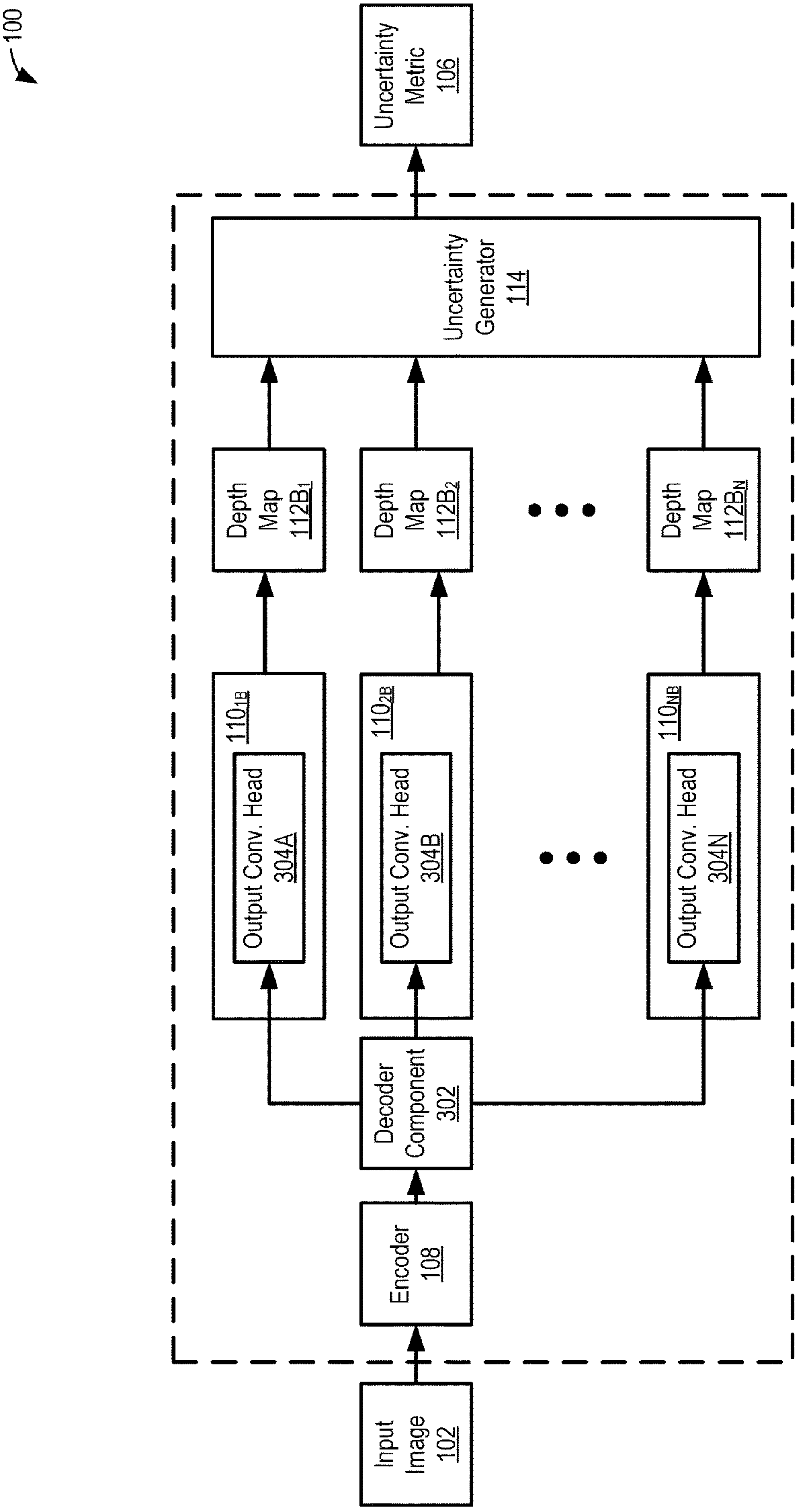
FIG. 3 depicts an alternative configuration for the depth map prediction pathways, in accordance with examples of the present disclosure.

FIG. 3 depicts an alternative configuration for the depth map prediction pathways, in accordance with examples of the present disclosure. In certain aspects, and similar to FIG. 2A, the encoder 1018 encodes the input image 102, and multiple parallel depth map prediction pathways (e.g. $\mathbf{110}_{1B}$-$\mathbf{110}_{NB}$) predict depth maps 112$B_1$-112$B_N$, such that an uncertainty generator 114 can determine an uncertainty metric 106 based on variances of the predicted depth maps 112$B_1$-112$B_N$. Though at least three prediction pathways 110 and accordingly at least three predicted depth maps 112B are shown, there may be any number, such as two or more than three. However, in FIG. 3 the depth map prediction pathways $\mathbf{110}_{1B}$-$\mathbf{110}_{NB}$ share the decoder component 302. In certain aspects, each depth map prediction pathway $\mathbf{110}_{1B}$-$\mathbf{110}_{NB}$ has its own output convolutional prediction head (304A-304N) (e.g., output convolution head 232 of FIG. 2B) to generate the respective predicted depth map (112$B_1$-112$B_N$). Sharing the decoder component 302 reduces computational requirements. For example, the decoder component 302 may contain shared convolutional layers (e.g., fusion stages 218-230 of FIG. 2B) for extracting features to be used by the output convolutional prediction head (304A-304N) in predicting depth maps.

In certain aspects, the configuration depicted in FIG. 3 with parallel output heads 304 retains a level of variation in the predicted depth maps 112B due to differences in the trained weights of each output convolutional prediction head (304A-304N). The uncertainty generator 114 can then utilize this variation to quantify uncertainty, while minimizing inference computations compared to using entirely separate decoder branches and/or performing multiple decoding passes.

As further depicted in FIG. 3, the output convolutional prediction heads 304A-304N can generate one of the respective predicted depth maps 112$B_1$-112$B_N$, respectively. While the depth map prediction pathways $\mathbf{110}_{1B}$-$\mathbf{110}_{NB}$ share the decoder component 302 including convolutional blocks within the decoder component 302, the output heads 304 are unique to each depth map prediction pathway 110. For example, the output convolutional prediction head 304A may contain a series of convolutional layers that process the decoder features in order to predict the depth map 112$B_1$. In some aspects, the output convolution head 304B can employ stacked convolutional layers to process the shared features in order to generate the predicted depth map 112$B_2$. In certain aspects, the output convolutional prediction heads 304A-304N have the same overall architecture but their trained weight parameters differ at convergence, leading to minor variations in their output for uncertainty quantifications.

The convolution operations in the output convolutional prediction heads 304A-304N may enrich the depth features of the decoder component 302 in order to predict a full resolution depth map associated with the input image. For example, stacked convolutional layers may reduce the number of channels to produce a 1-channel depth map containing predicted depth values for every pixel spatial location corresponding to the input image 102. In this manner, the parallel convolutional prediction heads 304A-304N, coupled with the shared decoder component 302, may provide a computationally efficient architecture for producing multiple depth predictions for use to analyze model uncertainty.

Figure 4:
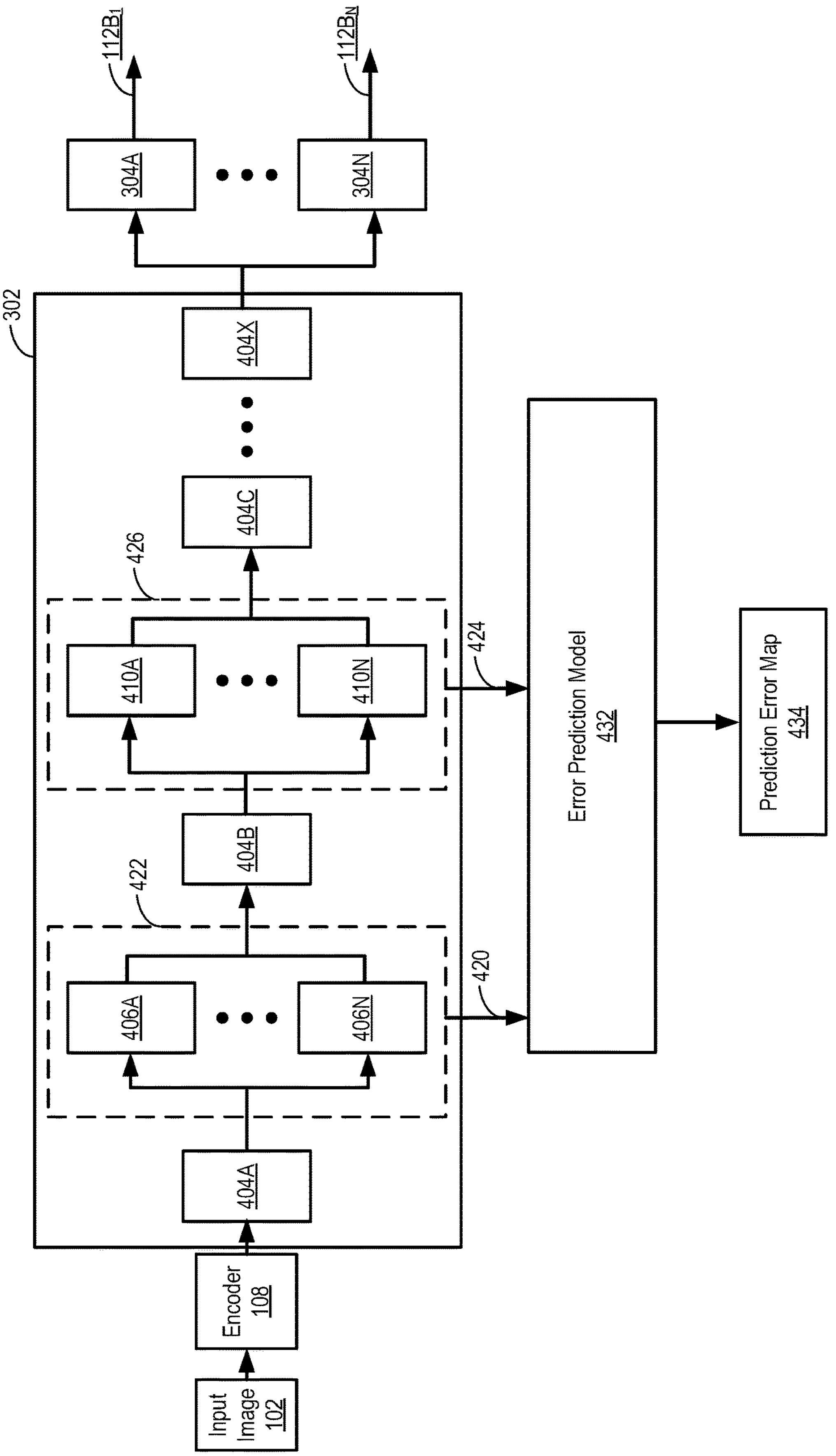
FIG. 4 depicts additional details of another implementation of an uncertainty quantification approach, in accordance with examples of the present disclosure.

FIG. 4 depicts additional details of another implementation of an uncertainty quantification approach, in accordance with examples of the present disclosure. In certain aspects, similar to FIG. 3, the encoder 108 encodes the input image 102, decoder component 302 performs some decoding of the output of encoder 108, and convolutional prediction heads 304A-304N generate predicted depth maps 112$B_1$-112$B_N$. It should be noted that the architecture of decoder component 302 shown in FIG. 4 is just one example architecture, and any suitable architecture may be used.

Decoder component 302, in the example shown in FIG. 4, includes a plurality of intermediate decoder layers 404A-404X. Though four layers are shown, there may be any suitable number of decoder layers 404. In certain aspects, decoder layers 404A-404X may correspond to fusion stages 218-230 of FIG. 2B.

Decoder component 302 further includes, after each of one or more of the decoder layers 404, an intermediate feature extraction layer, such as a convolutional kernel layer. For example, as shown, after decoder layer 404A there is a convolutional kernel layer 422, and after decoder layer 404B, there is a convolutional kernel layer 426. Though two convolutional layers are shown after decoder layers 404A-B, there may be any number of convolutional layers and/or other types of feature extraction layers after any set of the decoder layers 404.

In certain aspects, each feature extraction layer includes a plurality of (e.g., parallel) feature extraction units (e.g., convolutional kernels), each configured to output one or more features (e.g., feature maps) based on the output of the preceding decoder layer. In certain aspects, each of the plurality of feature extraction units in a given feature extraction layer is configured with the same hyperparameters, such as kernel size. Even with the same hyperparameters, different feature extraction units of the same feature extraction layer receiving the same input may output different feature(s). The variance between the features of different feature extraction units of the same feature extraction layer may be indicative of epstemic uncertainty, as in principle these feature extraction units configured with the same hyperparameters should converge to the same weights, and therefore feature output, given sufficient training. Thus, the variance indicates the weights of the different feature extraction units of the same feature extraction layer have not converged, such as due to insufficient training.

For example, convolutional kernels 406A-406N of convolutional layer 422 may be configured with the same hyperparameters, and convolutional kernels 410A-410N of convolutional layer 422 may be configured with the same hyperparameters. In certain aspects, different feature extraction layers may have feature extraction units with the same or different architectures, and/or configured with the same or different hyperparameters.

In certain aspects, the outputs of a given feature extraction layer are passed to a next decoder layer 404. For example, the outputs of convolutional kernels 406A-406N are passed to decoder layer 404B, and the outputs of convolutional kernels 410A-410N are passed to decoder layer 404C.

In certain aspects, the feature outputs of feature extraction units of each of one or more feature extraction layers alone may be used as an input into an uncertainty generator, such as uncertainty generator 114, to generate an uncertainty metric based on variance between the feature outputs. In certain aspects, the feature outputs of feature extraction units of each of one or more feature extraction layers may be used as an input into an uncertainty generator, such as uncertainty generator 114, along with additional input, such as predicted depth maps 112B, to generate an uncertainty metric based on variance between the feature outputs and variance between the other inputs (e.g., depth maps).

For example, in certain aspects, calculated feature variance 420 (e.g., per-pixel calculation) of features output by convolutional layer 422, and calculated feature variance 424 (e.g., per-pixel calculation) of features output by convolutional layer 426, may be input into an error prediction model 432. In some aspects, instead of feature variance 420 and feature variance 424 being input into the error prediction model 432, features output by convolutional layer 422 and features output by convolutional layer 426, may be input into error prediction model 432. As noted features of other layers, or variance of other layers, may be input into error prediction model 432. Error prediction model 432 may additionally or alternatively take as input predicted depth maps 112B, or calculated variance (e.g., per-pixel calculation) between predicted depth maps 112B.

In certain aspects, error prediction model 432 may be a small convolutional neural network. Based on the input, error prediction model 432 may be configured to predict an error/uncertainty map 434 associated with the estimated depth for input image regions. In certain aspects, the error prediction model 432 can be separately trained using a training dataset having known depth errors.

Figure 5:
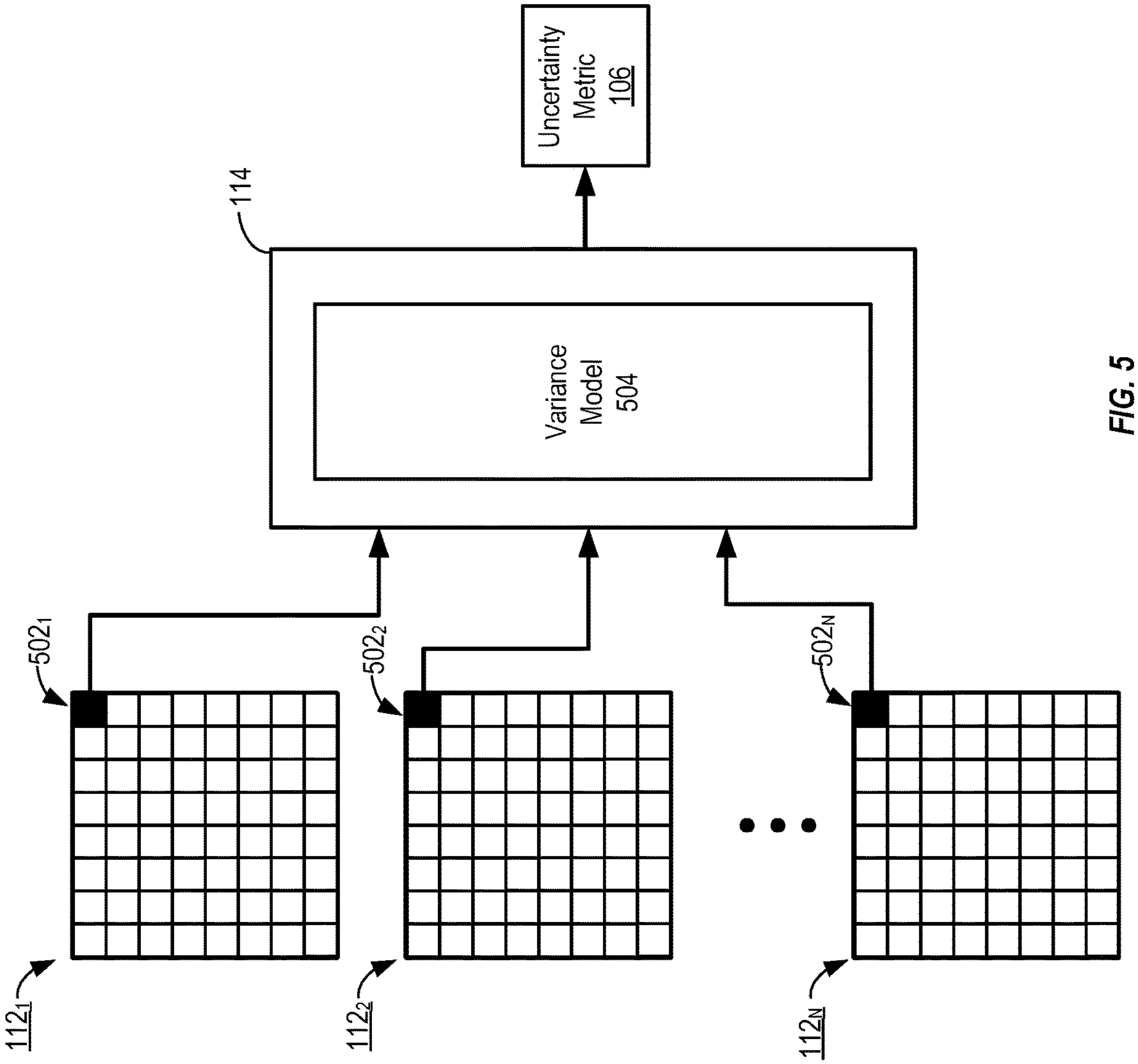
FIG. 5 depicts additional details for generating an uncertainty metric from the multiple predicted depth maps.

FIG. 5 illustrates additional details for generating an uncertainty metric 106 from the multiple predicted depth maps (112$_1$, 112$_2$ through 112$_N$). As depicted in FIG. 5, the uncertainty generator 114 can receive one or more predicted depth maps 112 associated with a given input image 102 from the one or more depth map prediction pathways 110.

In examples, the element 502$_1$ represents the depth prediction values at a sample pixel location of depth map 112$_1$. Similarly, 502$_2$ depicts sample predicted depth values from depth map 112$_2$. Additional depth predictions 502 denote depth predictions of corresponding predicted depth maps 112. In certain aspects, a variance model 504 is configured to analyze statistical variances across the multiple depth predictions 502 corresponding to a same pixel location. For example, the variance model 504 can compute population variance or standard deviation across the sampled depth predictions 502 for the same pixel coordinate location on the multiple predicted depth maps 112. The resulting per-pixel variance measurement, aggregated across the image, can therefore be interpreted as an uncertainty metric 106. In examples, higher variances can relate to areas of higher uncertainty in matching predicted depth maps 112 for an input image. Downstream applications can utilize the uncertainty metric 106 to selectively leverage or discard unreliable aspects of the predicted depth.

Example Artificial Intelligence for Monocular Depth Estimation with Uncertainty Quantification Certain aspects described herein may be implemented, at least in part, using some form of artificial intelligence (AI), e.g., the process of using a machine learning (ML) model to infer or predict output data based on input data. An example ML model may include a mathematical representation of one or more relationships among various objects to provide an output representing one or more predictions or inferences. Once an ML model has been trained, the ML model may be deployed to process data that may be similar to, or associated with, all or part of the training data and provide an output representing one or more predictions or inferences based on the input data.

ML is often characterized in terms of types of learning that generate specific types of learned models that perform specific types of tasks. For example, different types of machine learning include supervised learning, unsupervised learning, semi-supervised learning, and reinforcement learning.

Supervised learning algorithms generally model relationships and dependencies between input features (e.g., a feature vector) and one or more target outputs. Supervised learning uses labeled training data, which are data including one or more inputs and a desired output. Supervised learning may be used to train models to perform tasks like classification, where the goal is to predict discrete values, or regression, where the goal is to predict continuous values. Some example supervised learning algorithms include nearest neighbor, naive Bayes, decision trees, linear regression, support vector machines (SVMs), and artificial neural networks (ANNs).

Unsupervised learning algorithms work on unlabeled input data and train models that take an input and transform it into an output to solve a practical problem. Examples of unsupervised learning tasks are clustering, where the output of the model may be a cluster identification, dimensionality reduction, where the output of the model is an output feature vector that has fewer features than the input feature vector, and outlier detection, where the output of the model is a value indicating how the input is different from a typical example in the dataset. An example unsupervised learning algorithm is k-Means.

Semi-supervised learning algorithms work on datasets containing both labeled and unlabeled examples, where often the quantity of unlabeled examples is much higher than the number of labeled examples. However, the goal of a semi-supervised learning is that of supervised learning. Often, a semi-supervised model includes a model trained to produce pseudo-labels for unlabeled data that is then combined with the labeled data to train a second classifier that leverages the higher quantity of overall training data to improve task performance.

Reinforcement Learning algorithms use observations gathered by an agent from an interaction with an environment to take actions that may maximize a reward or minimize a risk. Reinforcement learning is a continuous and iterative process in which the agent learns from its experiences with the environment until it explores, for example, a full range of possible states. An example type of reinforcement learning algorithm is an adversarial network. Reinforcement learning may be particularly beneficial when used to improve or attempt to optimize a behavior of a model deployed in a dynamically changing environment, such as a wireless communication network.

ML models may be deployed in one or more devices (e.g., network entities such as base station(s) and/or user equipment(s)) to support various wired and/or wireless communication aspects of a communication system. For example, an ML model may be trained to identify patterns and relationships in data corresponding to a network, a device, an air interface, or the like. An ML model may improve operations relating to one or more aspects, such as transceiver circuitry controls, frequency synchronization, timing synchronization, channel state estimation, channel equalization, channel state feedback, modulation, demodulation, device positioning, transceiver tuning, beamforming, signal coding/decoding, network routing, load balancing, and energy conservation (to name just a few) associated with communications devices, services, and/or networks. AI-enhanced transceiver circuitry controls may include, for example, filter tuning, transmit power controls, gain controls (including automatic gain controls), phase controls, power management, and the like.

Aspects described herein may describe the performance of certain tasks and the technical solution of various technical problems by application of a specific type of ML model, such as an ANN. It should be understood, however, that other type(s) of AI models may be used in addition to or instead of an ANN. An ML model may be an example of an AI model, and any suitable AI model may be used in addition to or instead of any of the ML models described herein. Hence, unless expressly recited, subject matter regarding an ML model is not necessarily intended to be limited to just an ANN solution or machine learning. Further, it should be understood that, unless otherwise specifically stated, terms such "AI model," "ML model," "AI/ML model," "trained ML model," and the like are intended to be interchangeable.

Figure 6:
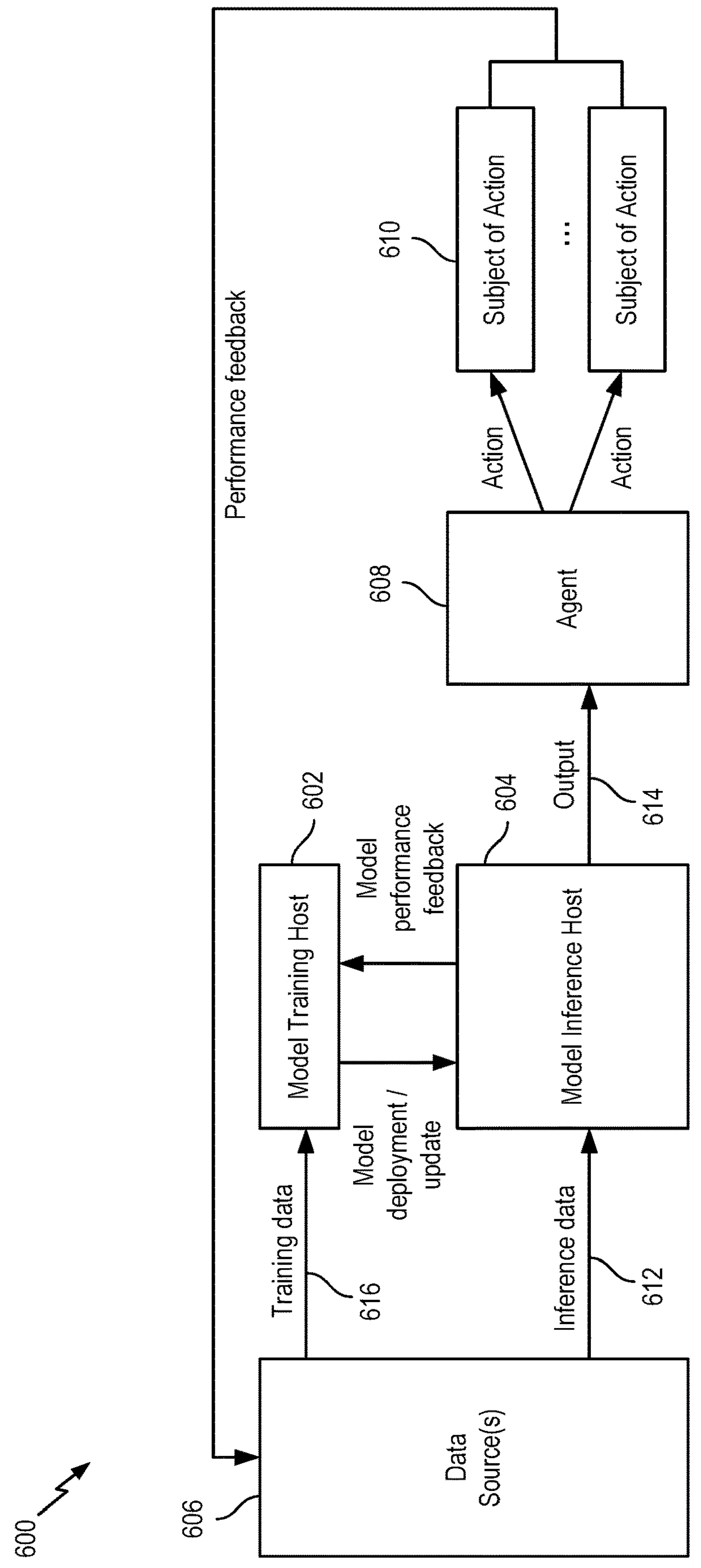
FIG. 6 illustrates an example artificial intelligence (AI) architecture that may be used for AI-enhanced wireless communications.

FIG. 6 is a diagram illustrating an example AI architecture 600 that may be used for monocular depth estimation with uncertainty quantification. As illustrated, the architecture 600 includes multiple logical entities, such as a model training host 602, a model inference host 604, data source(s) 606, and an agent 608. The AI architecture may be used in any of various use cases for wireless communications, such as those listed above.

The model inference host 604, in the architecture 600, is configured to run an ML model based on inference data 612 provided by data source(s) 606. The model inference host 604 may produce an output 614 (e.g., a prediction or inference, such as a discrete or continuous value) based on the inference data 612, that is then provided as input to the agent 608.

The agent 608 may be an element or an entity of a wireless communication system including, for example, a radio access network (RAN), a wireless local area network, a device-to-device (D2D) communications system, etc. As an example, the agent 608 may be a user equipment (UE), a base station or any disaggregated network entity thereof including a centralized unit (CU), a distributed unit (DU), and/or a radio unit (RU)), an access point, a wireless station, a RAN intelligent controller (RIC) in a cloud-based RAN, among some examples. Additionally, the type of agent 608 may also depend on the type of tasks performed by the model inference host 604, the type of inference data 612 provided to model inference host 604, and/or the type of output 614 produced by model inference host 604.

For example, if output 614 from the model inference host 604 is associated with beam management, the agent 608 may be or include a UE, a DU, or an RU. As another example, if output 614 from model inference host 604 is associated with transmission and/or reception scheduling, the agent 608 may be a CU or a DU.

After the agent 608 receives output 614 from the model inference host 604, agent 608 may determine whether to act based on the output. For example, if agent 608 is a DU or an RU and the output from model inference host 604 is associated with beam management, the agent 608 may determine whether to change or modify a transmit and/or receive beam based on the output 614. If the agent 608 determines to act based on the output 614, agent 608 may indicate the action to at least one subject of the action 610. For example, if the agent 608 determines to change or modify a transmit and/or receive beam for a communication between the agent 608 and the subject of action 610 (e.g., a UE), the agent 608 may send a beam switching indication to the subject of action 610 (e.g., a UE). As another example, the agent 608 may be a UE, the output 614 from model inference host 604 may be one or more predicted channel characteristics for one or more beams. For example, the model inference host 604 may predict channel characteristics for a set of beams based on the measurements of another set of beams. Based on the predicted channel characteristics, the agent 608, such as the UE, may send, to the subject of action 610, such as a BS, a request to switch to a different beam for communications. In some cases, the agent 608 and the subject of action 610 are the same entity.

The data sources 606 may be configured for collecting data that is used as training data 616 for training an ML model, or as inference data 612 for feeding an ML model inference operation. In particular, the data sources 606 may collect data from any of various entities (e.g., the UE and/or the BS), which may include the subject of action 610, and provide the collected data to a model training host 602 for ML model training. For example, after a subject of action 610 (e.g., a UE) receives a beam configuration from agent 608, the subject of action 610 may provide performance feedback associated with the beam configuration to the data sources 606, where the performance feedback may be used by the model training host 602 for monitoring and/or evaluating the ML model performance, such as whether the output 614, provided to agent 608, is accurate. In some examples, if the output 614 provided to agent 608 is inaccurate (or the accuracy is below an accuracy threshold), the model training host 602 may determine to modify or retrain the ML model used by model inference host 604, such as via an ML model deployment/update.

In certain aspects, the model training host 602 may be deployed at or with the same or a different entity than that in which the model inference host 604 is deployed. For example, in order to offload model training processing, which can impact the performance of the model inference host 604, the model training host 602 may be deployed at a model server as further described herein. Further, in some cases, training and/or inference may be distributed amongst devices in a decentralized or federated fashion.

Figure 7:
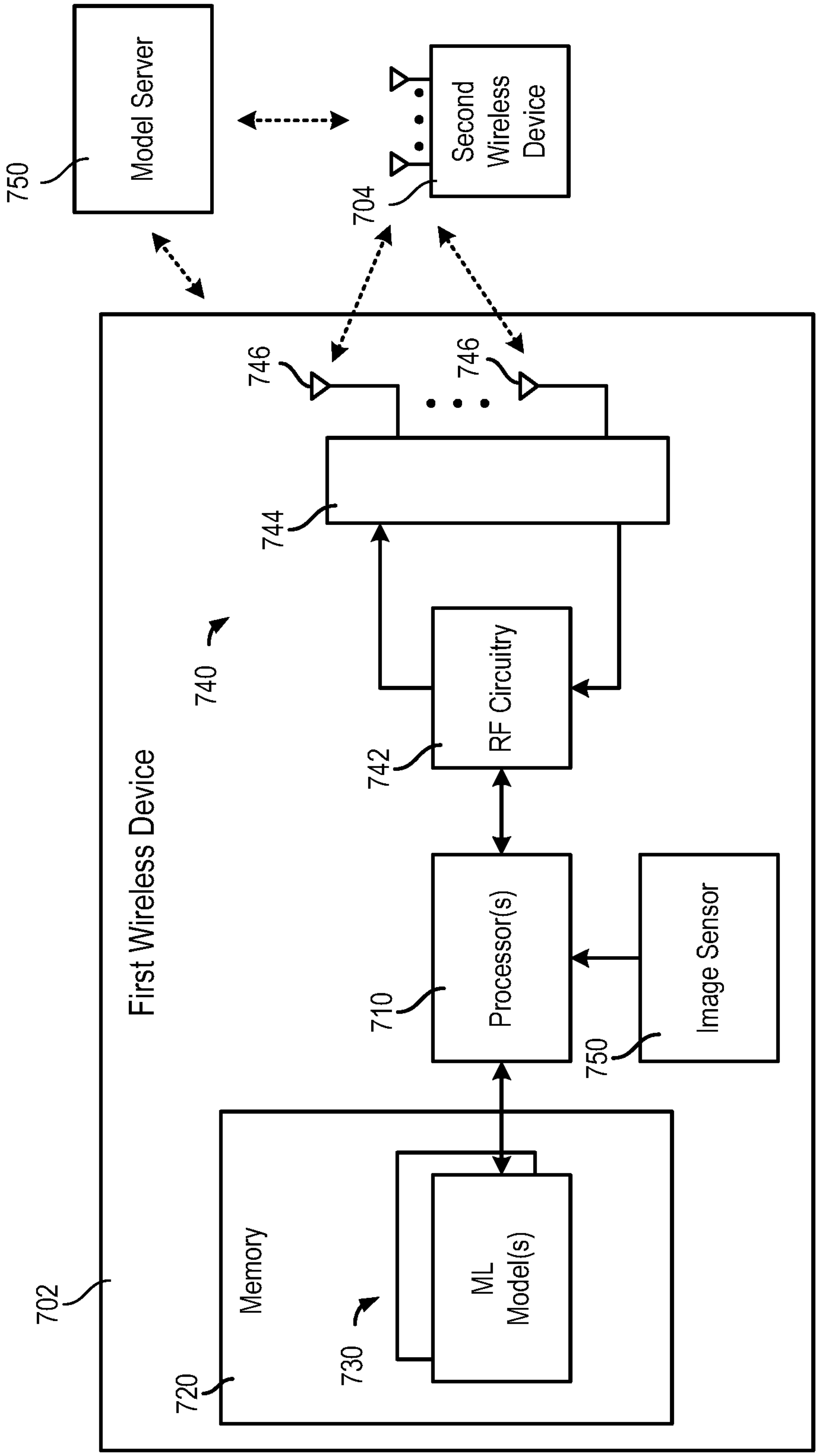
FIG. 7 illustrates an example AI architecture of a first wireless device that is in communication with a second wireless device.

FIG. 7 illustrates an example AI architecture of a first wireless device 702 that is in communication with a second wireless device 704. The first wireless device 702 may be for performing uncertainty quantification for monocular depth estimation as described herein with respect to FIGS. 1-5. Similarly, the second wireless device 704 may be for performing uncertainty quantification for monocular depth estimation as described herein with respect to FIGS. 1-5. Note that the AI architecture of the first wireless device 702 may be applied to the second wireless device 704.

The first wireless device 702 may be, or may include, a chip, system on chip (SoC), a system in package (SiP), chipset, package or device that includes one or more processors, processing blocks or processing elements (collectively "the processor 710") and one or more memory blocks or elements (collectively "the memory 720").

As an example, in a transmit mode, the processor 710 may transform information (e.g., packets or data blocks) into modulated symbols. As digital baseband signals (e.g., digital in-phase (I) and/or quadrature (Q) baseband signals representative of the respective symbols), the processor 710 may output the modulated symbols to a transceiver 740. The processor 710 may be coupled to the transceiver 740 for transmitting and/or receiving signals via one or more antennas 746. In this example, the transceiver 740 includes radio frequency (RF) circuitry 742, which may be coupled to the antennas 746 via an interface 744. As an example, the interface 744 may include a switch, a duplexer, a diplexer, a multiplexer, and/or the like. The RF circuitry 742 may convert the digital signals to analog baseband signals, for example, using a digital-to-analog converter. The RF circuitry 742 may include any of various circuitry, including, for example, baseband filter(s), mixer(s), frequency synthesizer(s), power amplifier(s), and/or low noise amplifier(s). In some cases, the RF circuitry 742 may upconvert the baseband signals to one or more carrier frequencies for transmission. The antennas 746 may emit RF signals, which may be received at the second wireless device 704.

In receive mode, RF signals received via the antenna 746 (e.g., from the second wireless device 704) may be amplified and converted to a baseband frequency (e.g., downconverted). The received baseband signals may be filtered and converted to digital I or Q signals for digital signal processing. The processor 710 may receive the digital I or Q signals and further process the digital signals, for example, demodulating the digital signals.

One or more ML models 730 may be stored in the memory 720 and accessible to the processor(s) 710. In certain cases, different ML models 730 with different characteristics may be stored in the memory 720, and a particular ML model 730 may be selected based on its characteristics and/or application as well as characteristics and/or conditions of first wireless device 702 (e.g., a power state, a mobility state, a battery reserve, a temperature, etc.). For example, the ML models 730 may have different inference data and output pairings (e.g., different types of inference data produce different types of output), different levels of accuracies (e.g., 80%, 90%, or 95% accurate) associated with the predictions (e.g., the output 614 of FIG. 6), different latencies (e.g., processing times of less than 10 ms, 100 ms, or 1 second) associated with producing the predictions, different ML model sizes (e.g., file sizes), different coefficients or weights, etc.

The processor 710 may use the ML model 730 to produce output data (e.g., the output 614 of FIG. 6) based on input data (e.g., the inference data 612 of FIG. 6), for example, as described herein with respect to the inference host 604 of FIG. 6. The ML model 730 may be used to perform any of various AI-enhanced tasks, such as those listed above.

As an example, the ML model 730 may generate an uncertainty metric associated with a depth map prediction based on an input image. The input data may include, for example, an input image. The output data may include, for example, an uncertainty metric as previously described. Note that other input data and/or output data may be used in addition to or instead of the examples described herein.

In certain aspects, a model server 750 may perform any of various ML model lifecycle management (LCM) tasks for the first wireless device 702 and/or the second wireless device 704. The model server 750 may operate as the model training host 602 and update the ML model 730 using training data. In some cases, the model server 750 may operate as the data source 606 to collect and host training data, inference data, and/or performance feedback associated with an ML model 730. In certain aspects, the model server 750 may host various types and/or versions of the ML models 730 for the first wireless device 702 and/or the second wireless device 704 to download.

In some cases, the model server 750 may monitor and evaluate the performance of the ML model 730 to trigger one or more LCM tasks. For example, the model server 750 may determine whether to activate or deactivate the use of a particular ML model at the first wireless device 702 and/or the second wireless device 704, and the model server 750 may provide such an instruction to the respective first wireless device 702 and/or the second wireless device 704. In some cases, the model server 750 may determine whether to switch to a different ML model 730 being used at the first wireless device 702 and/or the second wireless device 704, and the model server 750 may provide such an instruction to the respective first wireless device 702 and/or the second wireless device 704. In yet further examples, the model server 750 may also act as a central server for decentralized machine learning tasks, such as federated learning.

Example Artificial Intelligence Model

Figure 8:
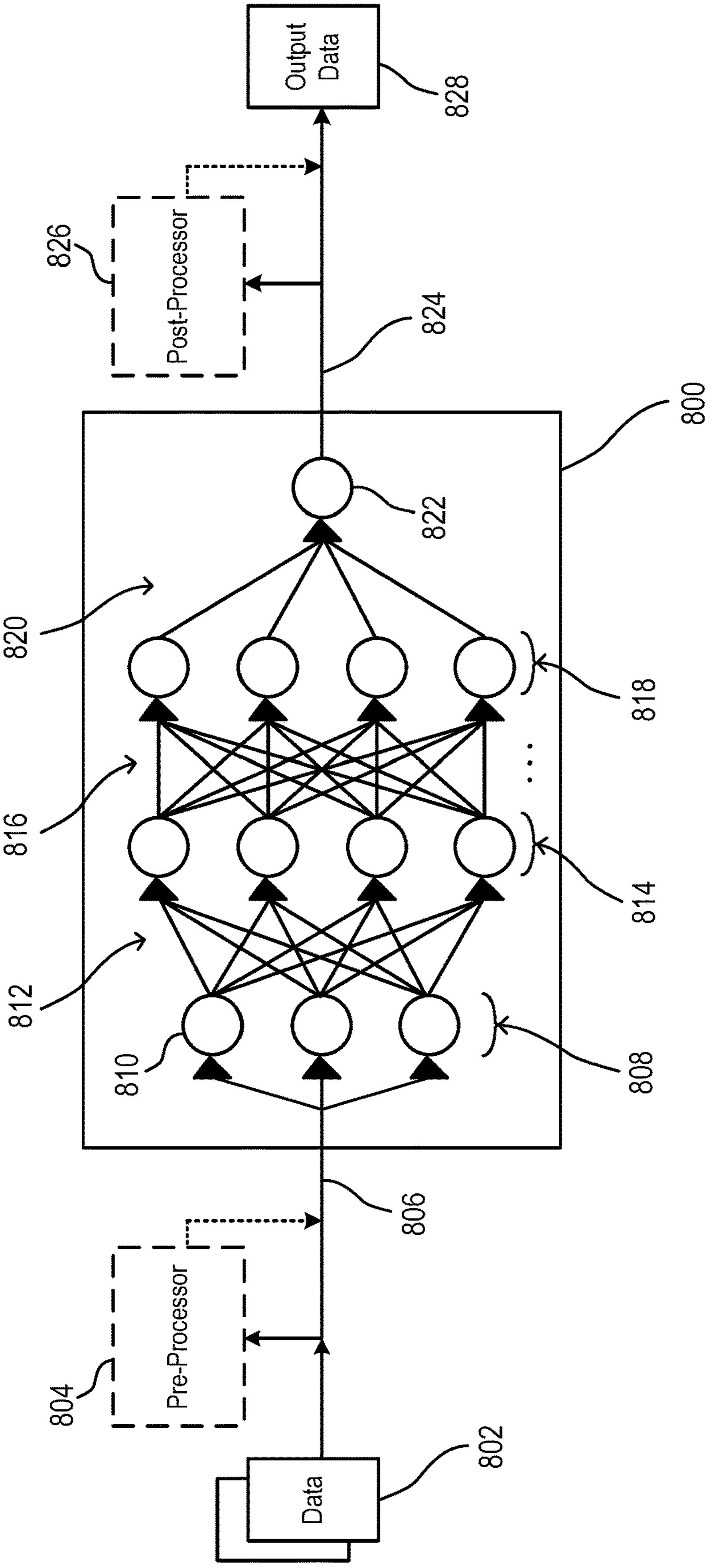
FIG. 8 illustrates an example artificial neural network.

FIG. 8 is an illustrative block diagram of an example artificial neural network (ANN) 800.

ANN 800 may receive input data 806 which may include one or more bits of data 802, pre-processed data output from pre-processor 804 (optional), or some combination thereof. Here, data 802 may include training data, verification data, application-related data, or the like, e.g., depending on the stage of development and/or deployment of ANN 800. Pre-processor 804 may be included within ANN 800 in some other implementations. Pre-processor 804 may, for example, process all or a portion of data 802 which may result in some of data 802 being changed, replaced, deleted, etc. In some implementations, pre-processor 804 may add additional data to data 802.

ANN 800 includes at least one first layer 808 of artificial neurons 810 (e.g., perceptrons) to process input data 806 and provide resulting first layer output data via edges 812 to at least a portion of at least one second layer 814. Second layer 814 processes data received via edges 812 and provides second layer output data via edges 816 to at least a portion of at least one third layer 818. Third layer 818 processes data received via edges 816 and provides third layer output data via edges 820 to at least a portion of a final layer 822 including one or more neurons to provide output data 824. All or part of output data 824 may be further processed in some manner by (optional) post-processor 826. Thus, in certain examples, ANN 800 may provide output data 828 that is based on output data 824, post-processed data output from post-processor 826, or some combination thereof. Post-processor 826 may be included within ANN 800 in some other implementations. Post-processor 826 may, for example, process all or a portion of output data 824 which may result in output data 828 being different, at least in part, to output data 824, e.g., as result of data being changed, replaced, deleted, etc. In some implementations, post-processor 826 may be configured to add additional data to output data 824. In this example, second layer 814 and third layer 818 represent intermediate or hidden layers that may be arranged in a hierarchical or other like structure. Although not explicitly shown, there may be one or more further intermediate layers between the second layer 814 and the third layer 818.

The structure and training of artificial neurons 810 in the various layers may be tailored to specific requirements of an application. Within a given layer of an ANN, some or all of the neurons may be configured to process information provided to the layer and output corresponding transformed information from the layer. For example, transformed information from a layer may represent a weighted sum of the input information associated with or otherwise based on a non-linear activation function or other activation function used to "activate" artificial neurons of a next layer. Artificial neurons in such a layer may be activated by or be responsive to weights and biases that may be adjusted during a training process. Weights of the various artificial neurons may act as parameters to control a strength of connections between layers or artificial neurons, while biases may act as parameters to control a direction of connections between the layers or artificial neurons. An activation function may select or determine whether an artificial neuron transmits its output to the next layer or not in response to its received data. Different activation functions may be used to model different types of non-linear relationships. By introducing non-linearity into an ML model, an activation function allows the ML model to "learn" complex patterns and relationships in the input data (e.g., 606 in FIG. 6). Some non-exhaustive example activation functions include a linear function, binary step function, sigmoid, hyperbolic tangent (tanh), a rectified linear unit (ReLU) and variants, exponential linear unit (ELU), Swish, Softmax, and others.

Design tools (such as computer applications, programs, etc.) may be used to select appropriate structures for ANN 800 and a number of layers and a number of artificial neurons in each layer, as well as selecting activation functions, a loss function, training processes, etc. Once an initial model has been designed, training of the model may be conducted using training data. Training data may include one or more datasets within which ANN 800 may detect, determine, identify or ascertain patterns. Training data may represent various types of information, including written, visual, audio, environmental context, operational properties, etc. During training, parameters of artificial neurons 810 may be changed, such as to minimize or otherwise reduce a loss function or a cost function. A training process may be repeated multiple times to fine-tune ANN 800 with each iteration.

Various ANN model structures are available for consideration. For example, in a feedforward ANN structure each artificial neuron 810 in a layer receives information from the previous layer and likewise produces information for the next layer. In a convolutional ANN structure, some layers may be organized into filters that extract features from data (e.g., training data and/or input data). In a recurrent ANN structure, some layers may have connections that allow for processing of data across time, such as for processing information having a temporal structure, such as time series data forecasting.

In an autoencoder ANN structure, compact representations of data may be processed and the model trained to predict or potentially reconstruct original data from a reduced set of features. An autoencoder ANN structure may be useful for tasks related to dimensionality reduction and data compression.

A generative adversarial ANN structure may include a generator ANN and a discriminator ANN that are trained to compete with each other. Generative-adversarial networks (GANs) are ANN structures that may be useful for tasks relating to generating synthetic data or improving the performance of other models.

A transformer ANN structure makes use of attention mechanisms that may enable the model to process input sequences in a parallel and efficient manner. An attention mechanism allows the model to focus on different parts of the input sequence at different times. Attention mechanisms may be implemented using a series of layers known as attention layers to compute, calculate, determine or select weighted sums of input features based on a similarity between different elements of the input sequence. A transformer ANN structure may include a series of feedforward ANN layers that may learn non-linear relationships between the input and output sequences. The output of a transformer ANN structure may be obtained by applying a linear transformation to the output of a final attention layer. A transformer ANN structure may be of particular use for tasks that involve sequence modeling, or other like processing.

Another example type of ANN structure, is a model with one or more invertible layers. Models of this type may be inverted or "unwrapped" to reveal the input data that was used to generate the output of a layer.

Other example types of ANN model structures include fully connected neural networks (FCNNs) and long short-term memory (LSTM) networks.

ANN 800 or other ML models may be implemented in various types of processing circuits along with memory and applicable instructions therein, for example, as described herein with respect to FIGS. 6 and 7. For example, general-purpose hardware circuits, such as, such as one or more central processing units (CPUs) and one or more graphics processing units (GPUs) may be employed to implement a model. One or more ML accelerators, such as tensor processing units (TPUs), embedded neural processing units (eNPUs), or other special-purpose processors, and/or field-programmable gate arrays (FPGAs), application-specific integrated circuits (ASICs), or the like also may be employed. Various programming tools are available for developing ANN models.

Aspects of Artificial Intelligence Model Training

There are a variety of model training techniques and processes that may be used prior to, or at some point following, deployment of an ML model, such as ANN 800 of FIG. 8.

As part of a model development process, information in the form of applicable training data may be gathered or otherwise created for use in training an ML model accordingly. For example, training data may be gathered or otherwise created regarding information associated with received/transmitted signal strengths, interference, and resource usage data, as well as any other relevant data that might be useful for training a model to address one or more problems or issues in a communication system. In certain instances, all or part of the training data may originate in one or more user equipments (UEs), one or more network entities, or one or more other devices in a wireless communication system. In some cases, all or part of the training data may be aggregated from multiple sources (e.g., one or more UEs, one or more network entities, the Internet, etc.). For example, wireless network architectures, such as self-organizing networks (SONs) or mobile drive test (MDT) networks, may be adapted to support collection of data for ML model applications. In another example, training data may be generated or collected online, offline, or both online and offline by a UE, network entity, or other device(s), and all or part of such training data may be transferred or shared (in real or near-real time), such as through store and forward functions or the like. Offline training may refer to creating and using a static training dataset, e.g., in a batched manner, whereas online training may refer to a real-time or near-real-time collection and use of training data. For example, an ML model at a network device (e.g., a UE) may be trained and/or fine-tuned using online or offline training. For offline training, data collection and training can occur in an offline manner at the network side (e.g., at a base station or other network entity) or at the UE side. For online training, the training of a UE-side ML model may be performed locally at the UE or by a server device (e.g., a server hosted by a UE vendor) in a real-time or near-real-time manner based on data provided to the server device from the UE.

In certain instances, all or part of the training data may be shared within a wireless communication system, or even shared (or obtained from) outside of the wireless communication system.

Once an ML model has been trained with training data, its performance may be evaluated. In some scenarios, evaluation/verification tests may use a validation dataset, which may include data not in the training data, to compare the model's performance to baseline or other benchmark information. If model performance is deemed unsatisfactory, it may be beneficial to fine-tune the model, e.g., by changing its architecture, re-training it on the data, or using different optimization techniques, etc. Once a model's performance is deemed satisfactory, the model may be deployed accordingly. In certain instances, a model may be updated in some manner, e.g., all or part of the model may be changed or replaced, or undergo further training, just to name a few examples.

As part of a training process for an ANN, such as ANN 800 of FIG. 8, parameters affecting the functioning of the artificial neurons and layers may be adjusted. For example, backpropagation techniques may be used to train the ANN by iteratively adjusting weights and/or biases of certain artificial neurons associated with errors between a predicted output of the model and a desired output that may be known or otherwise deemed acceptable. Backpropagation may include a forward pass, a loss function, a backward pass, and a parameter update that may be performed in training iteration. The process may be repeated for a certain number of iterations for each set of training data until the weights of the artificial neurons/layers are adequately tuned.

Backpropagation techniques associated with a loss function may measure how well a model is able to predict a desired output for a given input. An optimization algorithm may be used during a training process to adjust weights and/or biases to reduce or minimize the loss function which should improve the performance of the model. There are a variety of optimization algorithms that may be used along with backpropagation techniques or other training techniques. Some initial examples include a gradient descent based optimization algorithm and a stochastic gradient descent based optimization algorithm. A stochastic gradient descent (or ascent) technique may be used to adjust weights/biases in order to minimize or otherwise reduce a loss function. A mini-batch gradient descent technique, which is a variant of gradient descent, may involve updating weights/biases using a small batch of training data rather than the entire dataset. A momentum technique may accelerate an optimization process by adding a momentum term to update or otherwise affect certain weights/biases.

An adaptive learning rate technique may adjust a learning rate of an optimization algorithm associated with one or more characteristics of the training data. A batch normalization technique may be used to normalize inputs to a model in order to stabilize a training process and potentially improve the performance of the model.

A "dropout" technique may be used to randomly drop out some of the artificial neurons from a model during a training process, e.g., in order to reduce overfitting and potentially improve the generalization of the model.

An "early stopping" technique may be used to stop an on-going training process early, such as when a performance of the model using a validation dataset starts to degrade.

Another example technique includes data augmentation to generate additional training data by applying transformations to all or part of the training information.

A transfer learning technique may be used which involves using a pre-trained model as a starting point for training a new model, which may be useful when training data is limited or when there are multiple tasks that are related to each other.

A multi-task learning technique may be used which involves training a model to perform multiple tasks simultaneously to potentially improve the performance of the model on one or more of the tasks. Hyperparameters or the like may be input and applied during a training process in certain instances.

Another example technique that may be useful with regard to an ML model is some form of a "pruning" technique. A pruning technique, which may be performed during a training process or after a model has been trained, involves the removal of unnecessary (e.g., because they have no impact on the output) or less necessary (e.g., because they have negligible impact on the output), or possibly redundant features from a model. In certain instances, a pruning technique may reduce the complexity of a model or improve efficiency of a model without undermining the intended performance of the model.

Pruning techniques may be particularly useful in the context of wireless communication, where the available resources (such as power and bandwidth) may be limited. Some example pruning techniques include a weight pruning technique, a neuron pruning technique, a layer pruning technique, a structural pruning technique, and a dynamic pruning technique. Pruning techniques may, for example, reduce the amount of data corresponding to a model that may need to be transmitted or stored.

Weight pruning techniques may involve removing some of the weights from a model. Neuron pruning techniques may involve removing some neurons from a model. Layer pruning techniques may involve removing some layers from a model. Structural pruning techniques may involve removing some connections between neurons in a model. Dynamic pruning techniques may involve adapting a pruning strategy of a model associated with one or more characteristics of the data or the environment. For example, in certain wireless communication devices, a dynamic pruning technique may more aggressively prune a model for use in a low-power or low-bandwidth environment, and less aggressively prune the model for use in a high-power or high-bandwidth environment. In certain aspects, pruning techniques also may be applied to training data, e.g., to remove outliers, etc. In some implementations, pre-processing techniques directed to all or part of a training dataset may improve model performance or promote faster convergence of a model. For example, training data may be pre-processed to change or remove unnecessary data, extraneous data, incorrect data, or otherwise identifiable data. Such pre-processed training data may, for example, lead to a reduction in potential overfitting, or otherwise improve the performance of the trained model.

One or more of the example training techniques presented above may be employed as part of a training process. As above, some example training processes that may be used to train an ML model include supervised learning, unsupervised learning, semi-supervised learning, and reinforcement learning technique.

Decentralized, distributed, or shared learning, such as federated learning, may enable training on data distributed across multiple devices or organizations, without the need to centralize data or the training. Federated learning may be particularly useful in scenarios where data is sensitive or subject to privacy constraints, or where it is impractical, inefficient, or expensive to centralize data. In the context of wireless communication, for example, federated learning may be used to improve performance by allowing an ML model to be trained on data collected from a wide range of devices and environments. For example, an ML model may be trained on data collected from a large number of wireless devices in a network, such as distributed wireless communication nodes, smartphones, or internet-of-things (IoT) devices, to improve the network's performance and efficiency. With federated learning, a user equipment (UE) or other device may receive a copy of all or part of a model and perform local training on such copy of all or part of the model using locally available training data. Such a device may provide update information (e.g., trainable parameter gradients) regarding the locally trained model to one or more other devices (such as a network entity or a server) where the updates from other-like devices (such as other UEs) may be aggregated and used to provide an update to a shared model or the like. A federated learning process may be repeated iteratively until all or part of a model obtains a satisfactory level of performance. Federated learning may enable devices to protect the privacy and security of local data, while supporting collaboration regarding training and updating of all or part of a shared model.

In some implementations, one or more devices or services may support processes relating to a ML model's usage, maintenance, activation, reporting, or the like. In certain instances, all or part of a dataset or model may be shared across multiple devices, e.g., to provide or otherwise augment or improve processing. In some examples, signaling mechanisms may be utilized at various nodes of wireless network to signal the capabilities for performing specific functions related to ML model, support for specific ML models, capabilities for gathering, creating, transmitting training data, or other ML related capabilities. ML models in wireless communication systems may, for example, be employed to support decisions relating to wireless resource allocation or selection, wireless channel condition estimation, interference mitigation, beam management, positioning accuracy, energy savings, or modulation or coding schemes, etc. In some implementations, model deployment may occur jointly or separately at various network levels, such as, a central unit (CU), a distributed unit (DU), a radio unit (RU), or the like.

Example Method for Generating an Uncertainty Metric

Figure 9:
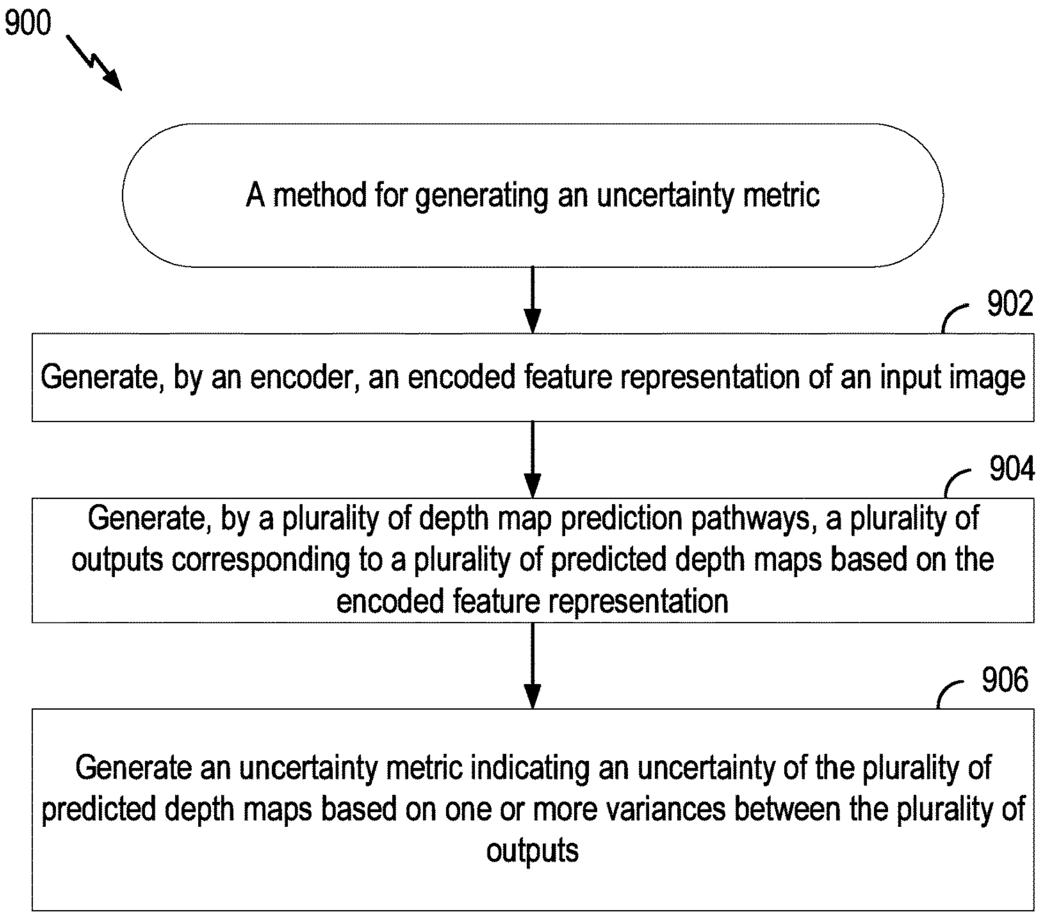
FIG. 9 depicts an example method for generating an uncertainty metric.

FIG. 9 shows a method 900 for generating an uncertainty metric associated with predicted depth maps. In one aspect, method 900, or any aspect related to it, may be performed by an apparatus, such as processing system 1000 of FIG. 10, which includes various components operable, configured, or adapted to perform the method 900.

Method 900 begins at 902 with generating, by an encoder, an encoded feature representation of an input image.

The method 900 may proceed to 904 with generating, by a plurality of depth map prediction pathways, a plurality of outputs corresponding to a plurality of predicted depth maps based on the encoded feature representation.

The method 900 may then end at 906 with generating an uncertainty metric indicating an uncertainty of the plurality of predicted depth maps based on one or more variances between the plurality of outputs.

Note that FIG. 9 is just one example of a method, and other methods including fewer, additional, or alternative steps are possible consistent with this disclosure.

Example Processing System for Generating an Uncertainty Metric

Figure 10:
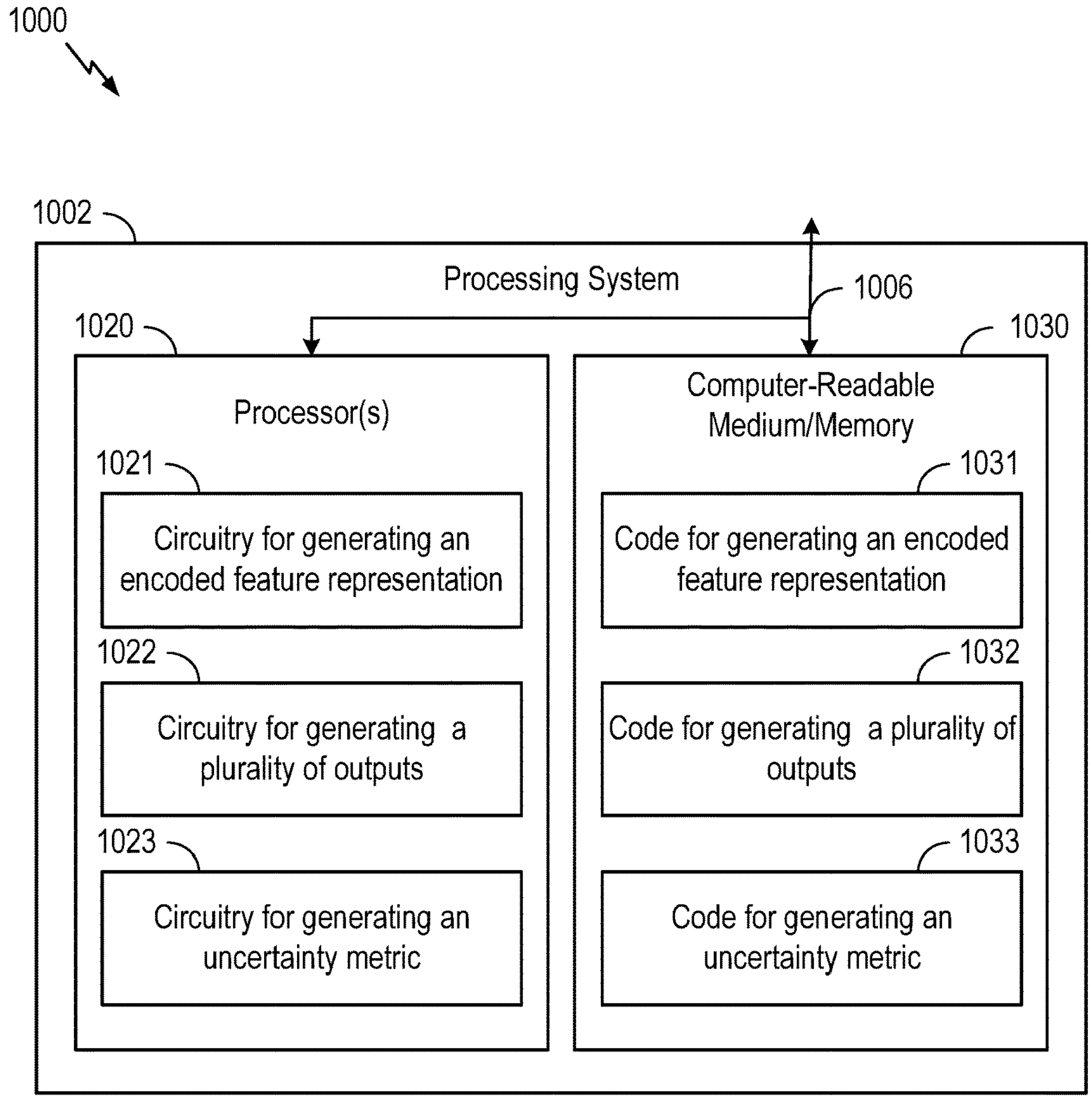
FIG. 10 depicts aspects of an example device.

FIG. 10 depicts aspects of an example processing system 1000.

The processing system 1000 includes a processing system 1002 includes one or more processors 1020. The one or more processors 1020 are coupled to a computer-readable medium/memory 1030 via a bus 1006. In certain aspects, the computer-readable medium/memory 1030 is configured to store instructions (e.g., computer-executable code) that when executed by the one or more processors 1020, cause the one or more processors 1020 to perform the method 900 described with respect to FIG. 9, or any aspect related to it, including any additional steps or sub-steps described in relation to FIG. 9.

In the depicted example, computer-readable medium/memory 1030 stores code (e.g., executable instructions) for generating, by an encoder, an encoded feature representation of an input image 1031, code for generating, by a plurality of depth map prediction pathways, a plurality of outputs corresponding to a plurality of predicted depth maps based on the encoded feature representation 1032, and code for generating an uncertainty metric indicating an uncertainty of the plurality of predicted depth maps based on one or more variances between the plurality of outputs. Processing of the code 1031-1033 may enable and cause the processing system 1000 to perform the method 900 described with respect to FIG. 9, or any aspect related to it.

The one or more processors 1020 include circuitry configured to implement (e.g., execute) the code stored in the computer-readable medium/memory 1030, including circuitry for generating, by an encoder, an encoded feature representation of an input image 1021, circuitry for generating, by a plurality of depth map prediction pathways, a plurality of outputs corresponding to a plurality of predicted depth maps based on the encoded feature representation 1022, and circuitry for generating an uncertainty metric indicating an uncertainty of the plurality of predicted depth maps based on one or more variances between the plurality of outputs 1023. Processing with circuitry 1021-1023 may enable and cause the processing system 1000 to perform the method 900 described with respect to FIG. 9, or any aspect related to it.

EXAMPLE CLAUSES

Implementation examples are described in the following numbered clauses:

Clause 1: A method for generating an uncertainty metric, comprising: generating, by an encoder, an encoded feature representation of an input image; generating, by a plurality of depth map prediction pathways, a plurality of outputs corresponding to a plurality of predicted depth maps based on the encoded feature representation; and generating an uncertainty metric indicating an uncertainty of the plurality of predicted depth maps based on one or more variances between the plurality of outputs.

Clause 2: A method in accordance with Clause 1, wherein each of the plurality of depth map prediction pathways comprises a respective decoder configured to: receive as input the encoded feature representation; and generate as output a respective predicted depth map of the plurality of predicted depth maps based on the encoded feature representation.

Clause 3: A method in accordance with Clause 2, wherein for each of the plurality of depth map prediction pathways, the respective decoder comprises one or more convolutional layers and one or more upsampling layers.

Clause 4. A method in accordance with Clause 3, wherein the one or more convolutional layers and the one or more upsampling layers correspond to symmetric counterparts of convolutional layers and downsampling layers in the encoder.

Clause 5: A method in accordance with Clause 2, wherein for each of the plurality of depth map prediction pathways, the respective decoder comprises a respective output convolutional head.

Clause 6: A method in accordance with Clause 1, wherein the plurality of depth map prediction pathways share at least one decoder component.

Clause 7: A method in accordance with Clause 6, wherein each of the plurality of depth map prediction pathways comprises a respective output convolutional head configured to generate a respective predicted depth map of the plurality of predicted depth maps.

Clause 8: A method in accordance with Clause 6, wherein the at least one decoder component comprises one or more convolutional layers.

Clause 9: A method in accordance with any one of Clauses 1-8, wherein the encoder comprises a neural network architecture including convolutional blocks between one or more encoding stages.

Clause 10: A method in accordance with Clause 9, wherein one or more of the convolutional blocks feed a decoding stage of one or more decoding stages of the plurality of depth map prediction pathways.

Clause 11: A method in accordance with any one of Clauses 1-10, wherein the plurality of outputs comprise the plurality of predicted depth maps.

Clause 12: A method in accordance with Clause 11, wherein the one or more variances comprise at least one of: block-level statistical variance between one or more portions of the plurality of predicted depth maps; or pixel-level statistical variance between the plurality of predicted depth maps.

Clause 13: A method in accordance with any one of Clauses 1-12, wherein the plurality of outputs comprise features output from one or more respective intermediate layers of each of the plurality of depth map prediction pathways.

Clause 14: A method in accordance with Clause 13, wherein the one or more respective intermediate layers comprise one or more respective convolutional kernels.

Clause 15: A method in accordance with Clause 13, wherein the plurality of outputs comprise the plurality of predicted depth maps, and wherein to generate the uncertainty metric, the one or more processors are configured to use an error prediction machine learning model with the one or more variances as input to the error prediction machine learning model.

Clause 16: A method in accordance with any one of Clauses 1-15, further comprising at least one image sensor configured to acquire the input image.

Clause 17: A method in accordance with any one of Clauses 1-16, further comprising a modem, coupled to one or more antennas, and coupled to the one or more processors, receiving the input image.

Clause 18: A method in accordance with Clause 17, wherein the modem and the one or more antennas are integrated into one of a vehicle, an extra-reality device, or a mobile device.

Clause 19: One or more apparatuses, comprising: one or more memories comprising executable instructions; and one or more processors configured to execute the executable instructions and cause the one or more apparatuses to perform a method in accordance with any one of clauses 1-18.

Clause 20: One or more apparatuses, comprising: one or more memories; and one or more processors, coupled to the one or more memories, configured to cause the one or more apparatuses to perform a method in accordance with any one of Clauses 1-18.

Clause 21: One or more apparatuses, comprising: one or more memories; and one or more processors, coupled to the one or more memories, configured to perform a method in accordance with any one of Clauses 1-18.

Clause 22: One or more apparatuses, comprising means for performing a method in accordance with any one of Clauses 1-18.

Clause 23: One or more non-transitory computer-readable media comprising executable instructions that, when executed by one or more processors of one or more apparatuses, cause the one or more apparatuses to perform a method in accordance with any one of Clauses 1-18.

Clause 24: One or more computer program products embodied on one or more computer-readable storage media comprising code for performing a method in accordance with any one of Clauses 1-18.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus, comprising:
- one or more memories configured to store an input image; and
- one or more processors, coupled to the one or more memories, configured to:
  - generate, by an encoder, an encoded feature representation of the input image;
  - generate, by a plurality of depth map prediction pathways, a plurality of outputs corresponding to a plurality of predicted depth maps based on the encoded feature representation; and
  - generate an uncertainty metric indicating an uncertainty of the plurality of predicted depth maps based on one or more variances between the plurality of outputs.

2. The apparatus of claim 1, wherein each of the plurality of depth map prediction pathways comprises a respective decoder configured to:
- receive as input the encoded feature representation; and
- generate as output a respective predicted depth map of the plurality of predicted depth maps based on the encoded feature representation.

3. The apparatus of claim 2, wherein for each of the plurality of depth map prediction pathways, the respective decoder comprises one or more convolutional layers and one or more upsampling layers.

4. The apparatus of claim 3, wherein the one or more convolutional layers and the one or more upsampling layers correspond to symmetric counterparts of convolutional layers and downsampling layers in the encoder.

5. The apparatus of claim 2, wherein for each of the plurality of depth map prediction pathways, the respective decoder comprises a respective output convolutional head.

6. The apparatus of claim 1, wherein the plurality of depth map prediction pathways share at least one decoder component.

7. The apparatus of claim 6, wherein each of the plurality of depth map prediction pathways comprises a respective output convolutional head configured to generate a respective predicted depth map of the plurality of predicted depth maps.

8. The apparatus of claim 6, wherein the at least one decoder component comprises one or more convolutional layers.

9. The apparatus of claim 1, wherein the encoder comprises a neural network architecture including convolutional blocks between one or more encoding stages.

10. The apparatus of claim 9, wherein one or more of the convolutional blocks feed a decoding stage of one or more decoding stages of the plurality of depth map prediction pathways.

11. The apparatus of claim 1, wherein the plurality of outputs comprise the plurality of predicted depth maps.

12. The apparatus of claim 11, wherein the one or more variances comprise at least one of:
- block-level statistical variance between one or more portions of the plurality of predicted depth maps; or
- pixel-level statistical variance between the plurality of predicted depth maps.

13. The apparatus of claim 1, wherein the plurality of outputs comprise features output from one or more respective intermediate layers of each of the plurality of depth map prediction pathways.

14. The apparatus of claim 13, wherein the one or more respective intermediate layers comprise one or more respective convolutional kernels.

15. The apparatus of claim 13, wherein the plurality of outputs comprise the plurality of predicted depth maps, and wherein to generate the uncertainty metric, the one or more processors are configured to use an error prediction machine learning model with the one or more variances as input to the error prediction machine learning model.

16. The apparatus of claim 1, further comprising at least one image sensor configured to acquire the input image.

17. The apparatus of claim 1, further comprising a modem, coupled to one or more antennas, and coupled to the one or more processors, wherein the modem and the one or more antennas are configured to receive the input image.

18. The apparatus of claim 17, wherein the modem and the one or more antennas are integrated into one of a vehicle, an extra-reality device, or a mobile device.

19. A method for generating an uncertainty metric, comprising:
- generating, by an encoder, an encoded feature representation of an input image;
- generating, by a plurality of depth map prediction pathways, a plurality of outputs corresponding to a plurality of predicted depth maps based on the encoded feature representation; and
- generating an uncertainty metric indicating an uncertainty of the plurality of predicted depth maps based on one or more variances between the plurality of outputs.

20. A non-transitory computer-readable medium comprising instructions, which when executed by one or more processors, cause the one or more processors to perform operations comprising:
- generating, by an encoder, an encoded feature representation of an input image;
- generating, by a plurality of depth map prediction pathways, a plurality of outputs corresponding to a plurality of predicted depth maps based on the encoded feature representation; and
- generating an uncertainty metric indicating an uncertainty of the plurality of predicted depth maps based on one or more variances between the plurality of outputs.

* * * * *